United States Patent
Little et al.

(10) Patent No.: US 10,233,081 B2
(45) Date of Patent: *Mar. 19, 2019

(54) METHOD TO PREPARE ONE OR MORE CHEMICAL PRODUCTS USING HYDROGEN SULFIDE

(71) Applicant: SULFURCYCLE INTELLECTUAL PROPERTY HOLDING COMPANY LLC, Broomfield, CO (US)

(72) Inventors: C. Deane Little, Niwot, CO (US); Joseph Victor Kosmoski, Longmont, CO (US); Philip Henry Michael, Boulder, CO (US)

(73) Assignee: New Sky Energy Intellectual Property Holding Company, LLC, Boulder, CO (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/319,990

(22) PCT Filed: Jun. 17, 2015

(86) PCT No.: PCT/US2015/036254
§ 371 (c)(1),
(2) Date: Dec. 19, 2016

(87) PCT Pub. No.: WO2015/200069
PCT Pub. Date: Dec. 30, 2015

(65) Prior Publication Data
US 2017/0158508 A1 Jun. 8, 2017

Related U.S. Application Data

(60) Provisional application No. 62/017,146, filed on Jun. 25, 2014.

(51) Int. Cl.
| | | |
|---|---|---|
| *C25B 1/00* | (2006.01) | |
| *C01B 17/06* | (2006.01) | |
| *C01B 17/22* | (2006.01) | |
| *B01D 53/52* | (2006.01) | |
| *B01D 53/78* | (2006.01) | |

(Continued)

(52) U.S. Cl.
CPC .......... *C01B 17/06* (2013.01); *B01D 53/1462* (2013.01); *B01D 53/52* (2013.01);
(Continued)

(58) Field of Classification Search
None
See application file for complete search history.

(56) References Cited

U.S. PATENT DOCUMENTS

| | | |
|---|---|---|
| 2,252,867 A | 8/1941 | Sconce et al. |
| 3,249,522 A | 5/1966 | Bolmer |

(Continued)

FOREIGN PATENT DOCUMENTS

WO 2005121279 A1 12/2005

OTHER PUBLICATIONS

PCT International Search Report and Written Opinion in PCT/US2015/036254, dated Aug. 27, 2015, 8 pages.
(Continued)

*Primary Examiner* — Arun S Phasge
(74) *Attorney, Agent, or Firm* — Merchant & Gould P.C.

(57) ABSTRACT

Hydrogen sulfide is scrubbed from a gas stream to prepare dissolved alkali metal sulfide or hydrosulfide, which is used to prepare feed electrolyte solution for electrochemical processing to generate alkali metal hydroxide in catholyte and polysulfide in anolyte, which may be recovered from an electrochemical reactor and which may be subjected to further processing to precipitate elemental sulfur. Aqueous scrubbing solution may include alkali metal carbonate capture agent to capture hydrogen sulfide in alkali metal bicarbonate The gas stream may include carbon dioxide in addition to hydrogen sulfide, and a ratio of dissolved alkali metal carbonate to bicarbonate may be increased prior to electrochemical processing.

20 Claims, 13 Drawing Sheets

(51) Int. Cl.
  *B01D 53/73*  (2006.01)
  *B01D 53/14*  (2006.01)
  *C01D 7/00*  (2006.01)
  *C01D 7/12*  (2006.01)
  *C25B 1/16*  (2006.01)

(52) U.S. Cl.
  CPC ........... *B01D 53/526* (2013.01); *B01D 53/73* (2013.01); *B01D 53/78* (2013.01); *C01B 17/22* (2013.01); *C01D 7/00* (2013.01); *C01D 7/123* (2013.01); *C25B 1/00* (2013.01); *C25B 1/16* (2013.01); *B01D 2251/304* (2013.01); *B01D 2251/604* (2013.01); *B01D 2251/606* (2013.01); *B01D 2252/10* (2013.01); *B01D 2257/304* (2013.01); *B01D 2257/504* (2013.01); *Y02P 20/152* (2015.11)

(56) References Cited

U.S. PATENT DOCUMENTS

| | | |
|---|---|---|
| 3,409,520 A | 11/1968 | Bolmer |
| 3,801,698 A | 4/1974 | Lowrance et al. |
| 4,001,385 A | 1/1977 | Sanders |
| 4,038,366 A | 7/1977 | Fukuda et al. |
| 4,041,129 A | 8/1977 | Foster et al. |
| 4,162,187 A | 7/1979 | Smith et al. |
| 4,190,508 A | 2/1980 | Kametani et al. |
| 4,246,079 A | 1/1981 | Goodrich et al. |
| 4,772,366 A | 9/1988 | Winnick |
| 5,019,227 A | 5/1991 | White et al. |
| 5,082,526 A | 1/1992 | Dorris |
| 5,578,189 A | 11/1996 | Joshi et al. |
| 5,908,545 A | 6/1999 | Donini et al. |
| 9,845,539 B2 * | 12/2017 | Little .................... C25B 1/16 |
| 2009/0035199 A1 | 2/2009 | Mortson |
| 2009/0134040 A1 | 5/2009 | Gordon et al. |
| 2010/0187124 A1 | 7/2010 | Koveal |
| 2012/0055808 A1 | 3/2012 | Martin et al. |
| 2012/0094337 A1 | 4/2012 | Van Den Born et al. |

OTHER PUBLICATIONS

PCT International Preliminary Report on Patentability in PCT/US2015/036254, dated Dec. 27, 2016, 6 pages.

* cited by examiner

US 10,233,081 B2

METHOD TO PREPARE ONE OR MORE CHEMICAL PRODUCTS USING HYDROGEN SULFIDE

CROSS-REFERENCE

This application claims the benefit of U.S. provisional patent application No. 62/017,146 filed Jun. 25, 2014, the entire contents of which are incorporated by reference herein for all purposes. This application also incorporates by reference each and every part of international patent application no. PCT/US2013/077251, filed Dec. 21, 2013, as if each and every part thereof were set forth herein in full for all purposes.

FIELD

This disclosure relates to preparation of chemical products using hydrogen sulfide, and also relates to removing hydrogen sulfide from gas streams, with or without the removal also of carbon dioxide.

BACKGROUND

Hydrogen sulfide is a toxic material and considered a nuisance in many situations. In the oil and gas industry, hydrogen sulfide is often present in produced natural gas and petroleum gas, and may require expensive processing for removal to acceptable levels. Current processing options do not permit gas streams having concentrations of hydrogen sulfide above certain levels to be economically processed. A variety of waste gas streams containing hydrogen sulfide are also produced in a variety of industrial processing, posing at least a disposal problem in many situations.

SUMMARY

In some processing, scrubbing of hydrogen sulfide from gas streams in the form of alkali metal sulfide and/or alkali metal hydrosulfide may include electrochemical processing to produce hydroxide and alkali metal polysulfide. Polysulfide in anolyte may be recovered from the electrochemical processing, as a product or for further processing to prepare elemental sulfur precipitate. Processing may include limiting the generation of elemental sulfur during the electrochemical processing, to avoid reactor fouling that may occur in an electrochemical reactor and to reduce energy requirements by not oxidizing sulfur species all the way to the elemental sulfur form in the electrochemical reactor. Final oxidation from polysulfide form to elemental sulfur form may be performed following the electrochemical processing, for example by chemical oxidation.

In some processing, alkali metal carbonate capture agent may be used for capturing hydrogen sulfide in a form of alkali metal hydrosulfide. The use of a carbonate capture agent provides significant processing flexibility. Also, such processing may permit the use of lower-cost carbonate feeds, for example as may be sourced from mined trona or other sources, as feed to form valuable alkali metal hydroxide product. Such processing may make viable various hydrogen sulfide-containing feed sources that are not currently economically treatable, for example natural gas or petroleum gas streams having very high hydrogen sulfide contents. Processing of such streams may target production of alkali metal hydroxide as a valuable product facilitated by the hydrogen sulfide in the gas stream being treated, so that in some situations hydrogen sulfide may become a valuable process feed to produce valuable alkali metal hydroxide rather than a nuisance material. Value from clean hydrocarbon gas that might otherwise have no value due to the high level of hydrogen sulfide and added value of recovered sulfur product may also positively impact process economics.

Some example processing combinations of this disclosure are provided below in the detailed description and the example processing combinations disclosed in the claims, with reference to the figures.

DETAILED DESCRIPTION

Reference will now be made to the figures in relation to description of various examples of processing implementations, using alkali metal-containing capture agents to scrub hydrogen sulfide alone, or optionally with scrubbing also of carbon dioxide. This description will be exemplified by primary reference to sodium as the alkali metal, but the description applies equally to the use of other alkali metals, such as potassium or lithium, with potassium generally being a more preferred alternative than lithium. A capture agent will generally be provided in the form of an alkaline sorbent, which may be, for example in a liquid form or a solid form when contacted with a gas stream to be treated for removal of hydrogen sulfide, alone or together with carbon dioxide, although the discussion below and with reference to the figures is presented with primary reference to the use of alkaline sorbent that is in the form of an aqueous liquid having capture agent dissolved therein. Similar processing may also be applied to the use of solid form alkaline sorbent after dissolving captured material in aqueous liquid for further processing through electrochemical processing and sulfur recovery.

Figure 1:
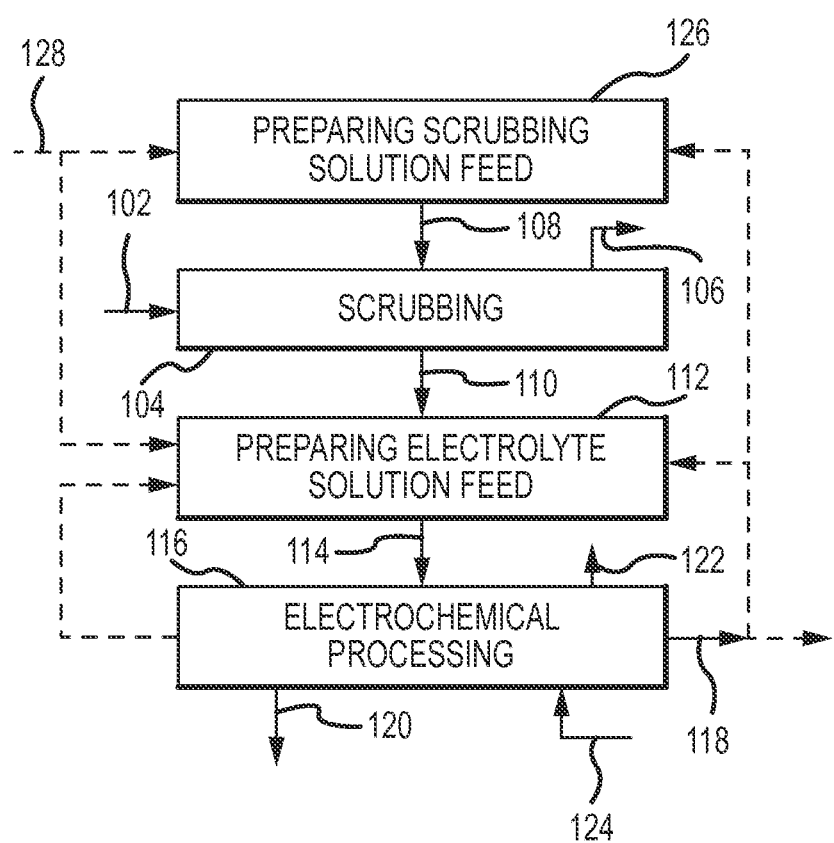
FIGS. 1-13 are generalized process block diagrams illustrating some various implementations of methods of this disclosure.

FIG. 1 shows a general process block diagram for various implementations for various processing aspects of this disclosure. As shown in FIG. 1, a feed gas stream 102 is subjected to scrubbing 104, during which some components are removed from the gas stream to prepare a treated gas stream 106. Components that may be removed from the feed gas stream 102 include at least hydrogen sulfide and may also include carbon dioxide. The feed gas stream 102 may be from any source, and may, for example, be a hydrogen sulfide-containing industrial waste stream, a refinery, gas plant or petrochemical processing stream, a natural gas or petroleum gas stream, or other hydrogen sulfide-containing gas stream. In some implementations, the feed gas stream 102 may be a produced gas stream, such as a natural gas stream that comprises a very high content of hydrogen sulfide that may not be economic to process with current techniques relative to the value of hydrocarbons within the stream. Such a feed gas stream 102 may have a hydrogen sulfide content, for example of at least 1 volume percent, at least 3 volume percent, at least 5 volume percent, at least 10 volume percent, at least 25 volume percent, at least 50 volume percent or at least 75 volume percent, or more. The feed gas steam 102 may be a substantially pure hydrogen sulfide gas stream, such as may be prepared in existing acid gas cleaning operations where hydrogen sulfide is scrubbed from a gas stream (e.g., amine scrubbing of natural gas or petroleum gas stream) and then hydrogen sulfide is stripped from the scrubbing solution to prepare a gas stream of mostly hydrogen sulfide. In other implementations, the hydrogen sulfide may be present in only a very small concentration in the feed gas stream 102, but above a level that may be tolerated in the particular situation (e.g., above a level required for pipeline-quality hydrocarbon gas). The feed gas stream 102 may often have a hydrogen sulfide level of at least 5 ppm (parts per million, which may be by weight or by volume) or at least 10 ppm, at least 100 ppm, or at least 0.1 volume percent.

In the implementations illustrated by FIG. 1, a scrubbing solution in the form an aqueous liquid feed 108 is fed to the scrubbing 104 to scrub hydrogen sulfide, and also to scrub carbon dioxide when present in the feed gas stream 102. The treated gas 106 will, accordingly, have a lower concentration of hydrogen sulfide, and also a lower concentration of carbon dioxide when the feed gas stream 102 contains carbon dioxide as well. At least a portion of the hydrogen sulfide removed from the feed gas stream 102 is captured in the aqueous liquid with sulfur from the hydrogen sulfide captured in a form of dissolved material including sodium sulfide and/or sodium hydrosulfide. References herein to sulfur are generally to sulfur in any form, such as in a form as found in a molecule or ion, and not just to sulfur in elemental form. References herein to "elemental" sulfur are to sulfur in an elemental form, with zero valance, and includes zero valance, multi-atom forms such as the stable ring form $S_8$. Elemental sulfur may be referred to herein as $S^0$, indicating a zero valance state, even though the sulfur in such zero valance state sulfur may be in the form of $S_8$. Relative proportions of captured sulfur in the form of sodium sulfide versus sodium hydrosulfide will depend, at least in part, upon the pH of the aqueous liquid during the scrubbing 104. Higher pHs will tend to have higher proportions of sodium sulfide and lower pHs will tend to have higher proportions of sodium hydrosulfide.

The aqueous liquid loaded with captured sulfur is recovered as a pregnant scrubbing solution 110, which is used in the processing identified as preparing electrolyte solution feed to prepare a feed of electrolyte solution 114 that is subjected to electrochemical processing 116. By pH of the scrubbing, it is meant the pH of the resulting pregnant scrubbing solution 110. When the pregnant scrubbing solution is to include most, essentially all or all of such captured sulfur in the form of sodium sulfide the scrubbing pH may often be at least pH 12, or even at least pH 13, and may often be in a range having a lower limit of from pH 12 or pH 13 and an upper limit of pH 14.6 or pH 14. When the pregnant scrubbing solution 110 is to include most, essentially all or all of such scrubbed hydrogen sulfide in the form of sodium hydrosulfide, the scrubbing pH may often be pH 11 or lower, and may often be in a range having a pH in a range having a lower limit of pH 9, pH 9.5 or pH 10 and an upper limit of pH 11.5 or pH 11. The preparing electrolyte solution feed 112 may involve adjusting one or more properties of the pregnant scrubbing solution 110 in preparation for the electrochemical processing 116. Such adjustments may include adding one or more materials to the pregnant solution 110 and/or removing one or more materials from the pregnant scrubbing solution 110. One adjustment that may often be beneficial during the preparing electrolyte solution feed is the adjustment of pH of the aqueous liquid, often to a higher pH. Increasing the solution pH may help to adjust a molar ratio of sodium sulfide to sodium hydrosulfide as may be desired for the feed of electrolyte solution 114. For some situations, during the preparing electrolyte solution feed 112, the pH of the aqueous liquid may be increased from a pH of 11 or lower to a pH of 12 or higher. In some situations pregnant scrubbing solution 110 may have properties as recovered from the scrubbing 104 that are suitable and desirable for use as the feed of electrolyte solution 114 for direct feed to the electrochemical processing 116. In such situations, the preparing electrolyte solution feed 112 may include simply transmitting the pregnant scrubbing solution 110 without change to the electrochemical processing 116 as the feed of electrolyte solution 114. This may be the case, for example when captured sulfur in the pregnant scrubbing solution is already essentially all in the form of alkali metal sulfide.

The electrochemical processing 116 may include the use of one or more electrochemical reactors, each of which may include one more electrochemical cells. During the electrochemical processing 116, a catholyte product 118 with sodium hydroxide and an anolyte product including sodium polysulfide may be recovered from the electrochemical processing 116, for example as may be obtained from a cathode region and an anode region, respectively, of one or more electrochemical cells of one or more electrochemical reactors. Hydrogen gas 122 is also generated during the electrochemical processing 116. Process water 124 is also provided for use in the electrochemical processing 116. The hydrogen 122 and the process water 124 may be generated in and added to, respectively, a cathode region of one or more electrochemical cells of one or more electrochemical reactors, for example as described below with reference to FIG. 2.

The processing shown in FIG. 1 also includes preparing scrubbing solution feed 126 to prepare the feed of aqueous liquid 108 that is fed to the scrubbing 104. In various implementations, the feed of the aqueous liquid 108 may include one or more capture agents, typically including alkali metal hydroxide and/or alkali metal carbonate, whether or not additional capture agents may also be present in the feed of the aqueous liquid 108. By capture agent, it is meant material within the feed of aqueous liquid 108 that reacts during the scrubbing 104 to effect capture of sulfur of hydrogen sulfide removed from the feed gas stream 102 and/or to capture carbon dioxide removed from the feed gas stream 102. For example, the captured sulfur may be in a $S^{2-}$ form, such as in a sulfide ion or in a hydrosulfide ion. During the preparing scrubbing solution feed 126, the feed of aqueous liquid 108 will be prepared having the desired properties for use in the scrubbing 104. As shown in FIG. 1, some or all of the sodium hydroxide of the catholyte product 118 may be provided to the preparing scrubbing solution feed 126. Such sodium hydroxide may be used to adjust pH and/or as a capture agent. Also as shown in FIG. 1, fresh feed 124 of capture agent may be provided as needed to provide sufficient capture agent for use to prepare the feed of aqueous liquid 108. Such fresh feed 124 of capture agent may include, for example, a fresh supply of sodium hydroxide and/or sodium carbonate, which may be provided either in a solid form or in solution. As shown in FIG. 1, some or all of such fresh feed 124 of capture agent may be directed in various implementations to the preparing electrolyte solution feed 112 in addition to or instead of being supplied to the preparing scrubbing solution feed 126. Also as shown in FIG. 1, in some implementations a portion of the catholyte product 118 may be provided to the preparing electrolyte solution feed 112, for example, to assist in adjusting the properties to prepare the feed of electrolyte solution 114.

Figure 2:
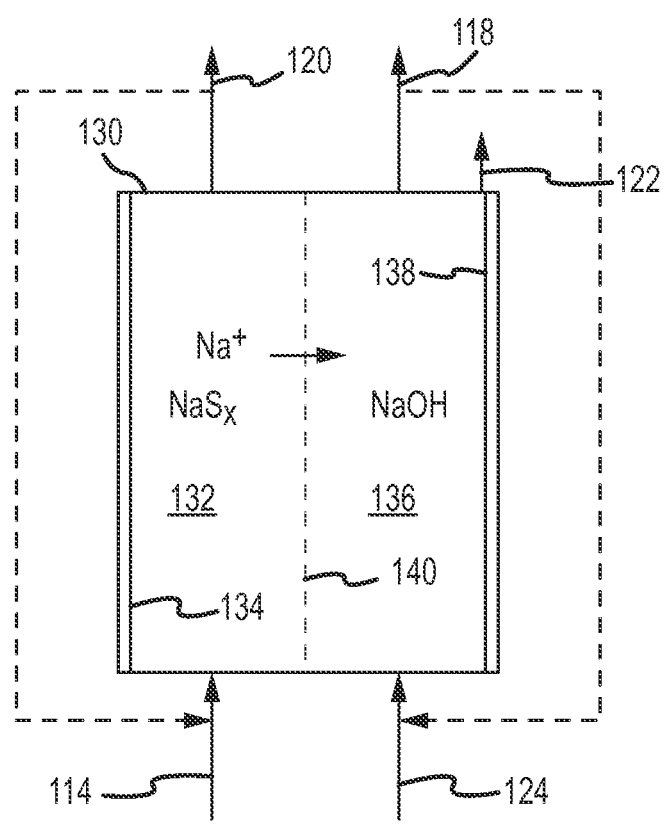

Any electrochemical reactor design may be used in the electrochemical processing. Reference is made to FIG. 2 illustrating a simple example of an electrochemical reactor 130. As shown in FIG. 2, the electrochemical reactor 130 includes a single electrochemical cell having an anode region 132 adjacent an anode 134 and a cathode region 136 adjacent to cathode 138. The anode region 132 and the cathode region 136 are separated by a separator 140. Such a separator 140 may include, for example, nonwoven fibers, polymer films, ion exchange membranes, microporous separators, or a layered combination of multiple materials such that mixing between the catholyte and anolyte is at least partially limited, but such that sodium ions may cross from the anolyte to the catholyte. In certain implementations, a highly selective separator such as a cation exchange membrane may be preferred so that a sodium hydroxide product of superior purity is obtained in the catholyte. Referring now to FIG. 2 together with FIG. 1, during operation of the electrochemical reactor 130, the feed of electrolyte solution 114 is provided to the anode region 132 and the process water 124 is provided to the cathode region 136. Electrical energy is applied between the anode 134 and cathode 138 to cause anions to move toward the anode 134 and the cations to move toward the cathode 138. The cation exchange membrane 140 permits sodium cations to move from the anode region 132 into the cathode region 136 for use to prepare sodium hydroxide in the cathode region 136. Captured sulfur in an $S^{2-}$ form in sulfides and hydrosulfides are oxidized in the anode region to form sodium polysulfides ($Na_2S_x$). In the cathode region 136 water is reduced at the cathode 138 resulting in the production of the hydrogen gas 122 and hydroxide ions that together with the sodium cations form sodium hydroxide in the cathode region 136. The anolyte product 120 including sodium polysulfides and catholyte product 118 including sodium hydroxide may be recovered from the anode region 132 and cathode region 136, respectively. As shown in FIG. 2, if desired a portion of catholyte and/or anolyte may be recycled to the cathode region 136 and anode region 132, respectively, to assist in preparing the catholyte product 118 and anolyte product 120 with desired properties and concentrations of components.

FIG. 2 shows only a very generalized illustration of a simple electrochemical reactor including only a single electrochemical cell. Electrochemical cells of other designs may alternatively be used in an electrochemical reactor, and an electrochemical reactor may include many electrochemical cells arranged in series and/or in parallel. Furthermore, the electrochemical processing may include multiple electrochemical reactors arranged in parallel and/or arranged in series. When multiple electrochemical reactors are arranged in series, the anolyte product 120 and catholyte products 118 may be obtained from one or more of the different series reactors. For example, series processing may be co-current, with the anolyte product 120 and catholyte product 118 both obtained from a last reactor or series. As another example, series processing may be counter-current, and the anolyte product 120 may be obtained from a last reactor in series and the catholyte product 118 may be obtained from a first reactor in series. The electrochemical processing 116 may include any desired operations before or after an electrochemical reactor or between stages of electrochemical reactors arranged in series.

Some preferred implementations of the general processing shown in FIG. 1 produce the catholyte product 120 that contains sodium polysulfides, but is free or essentially free of elemental sulfur, and particularly preferred is for the catholyte product 120 to be free or essentially free of any elemental sulfur precipitate. Elemental sulfur precipitate may coat the anode and/or other surfaces of an electrochemical reactor and may significantly impair effective operation of an electrochemical reactor. Therefore, it is preferred that the electrochemical processing is not conducted to such an extent that sulfur within the anode region is oxidized beyond the state of a polysulfide to form elemental sulfur, but rather that the anode product 120 will be free or essentially free of elemental sulfur, and in particular free or essentially free of elemental sulfur precipitate. In some implementations, the concentration of elemental sulfur in the anolyte product 120 will be not more than 100 ppm, not more than 1 ppm or not more than 100 ppb, by weight, whether or not in solution or in precipitate form. The sodium polysulfides in the anolyte product 120 may be recovered as a valuable product, either in solution in the form of the anolyte product 120 or as a solid precipitate prepared by further processing of the anolyte product 120. However, in some preferred implementations the catholyte product 120 may be further processed outside of the electrochemical processing 116 to prepare an elemental sulfur precipitate that may be recovered as a valuable product. In that regard, it will be appreciated that sufficient electrical current at an adequate voltage should be supplied to electrochemical reactors and that the electrochemical processing within an electrochemical reactor should be continued for such a limited time that oxidation of captured sulfur to a polysulfide form is achieved without oxidizing the sulfur further to form an elemental sulfur. Moreover, in more preferred implementations, the polysulfide components prepared during the electrochemical processing may be mostly in the form of a $Na_2S_4$ to $Na_2S_6$, and more preferably mostly in the form of $Na_2S_4$ and $Na_2S_5$.

In some preferred implementations the electrochemical processing 116 is performed with a voltage between the anode and cathode that is sufficient to split water at the cathode, generating hydrogen and hydroxide in the cathode region, but not sufficient to split water in the anode region, so that oxygen gas is preferably not generated from the anode region. In some implementations, the voltage between the anode and cathode may be in a range with a lower limit of 0.36 volts, 0.4 volts, 0.6 volts, 0.8 volts 1 volt or 1.2 volts, 1.4 volts or 1.6 volts and an upper limit of 2.05 volts, 2 volts, 1.8 volts, 1.6 volts or 1.4 volts, provided the upper limit is larger than the lower limit.

Figure 3:
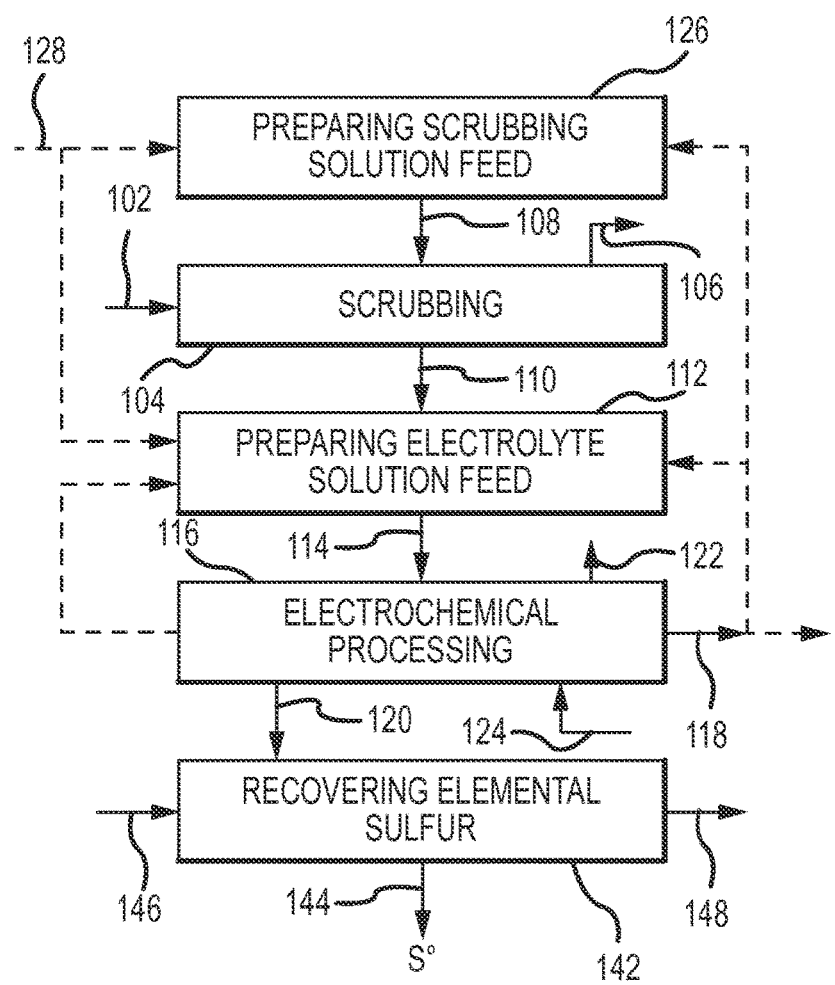

Reference is now made to FIG. 3, which shows the same processing as shown in FIG. 1, except that following the electrochemical processing, the anolyte product 120 is subjected to processing for recovering elemental sulfur 142 to prepare an elemental sulfur product 144. During the recovering elemental sulfur 142, the anolyte product 120 may be treated to convert at least a portion of sulfur of polysulfides in the anolyte product 120 into elemental sulfur precipitate. Such treating may include, for example, oxidizing the sulfur in the polysulfides further to form the elemental sulfur. Such oxidation may be accomplished in a further electrochemical processing operation, which may be similar to the electrochemical processing 116, but that is performed separately to permit greater control over impacts from the elemental sulfur precipitate that is formed. However, in preferred implementations the oxidation of polysulfides to elemental sulfur is accomplished chemically, using one or more chemical oxidizing agents. As shown in FIG. 3, such an oxidizing agent 146 may be added to the recovering elemental sulfur 142 to effect the oxidation of polysulfides to elemental sulfur, which readily precipitates given the generally low solubility of elemental sulfur in the aqueous liquid of the anolyte product 120. A treated effluent 148 may be recovered from the recovering elemental sulfur 142 and may be further treated for recycle, sale or disposal as desired. Examples of some particular chemicals that may be used as the oxidizing agent 146 include one or more of alkali metal hypochlorites (e.g., sodium or potassium hypochlorite, common bleach), alkali earth metal hypochlorites (e.g., calcium hypochlorite, bleaching powder), peroxides (e.g., hydrogen peroxide), alkali metal ferricyanides (e.g., sodium or potassium ferricyanide), sulfur dioxide gas, alkali metal metabisulfite (e.g., sodium or potassium metabisulfite), alkali metal trihalogenide (e.g., sodium or potassium triiodide; sodium or potassium tribromide), ozone (trioxygen), disulfur monoxide ($S_2O$), formaldehyde, oxalic acid, glutaraldehyde, ferric salts and oxygen gas (which may be provided in an air stream or in a stream of purified oxygen gas). The recovering elemental sulfur 144 may include any suitable solid-liquid separation technique for separating elemental sulfur precipitate from the treated liquid effluent 148, for example filtration, flotation or other separation technique. In some implementations, the treated effluent may be further processed to regenerate the oxidizing agent, either electrochemically or chemically. For example, oxidizing agents such as alkali metal hypochlorites, alkali metal ferricyanide and alkali metal trihalogenides may be regenerated by processing involving electrochemical processing. As another example, ferric salt oxidizing agents reduced to ferrous form during the recovering elemental sulfur 142 may be oxidized back to ferric form, for example by treating with oxygen gas or other oxidizing agent.

Figure 4:
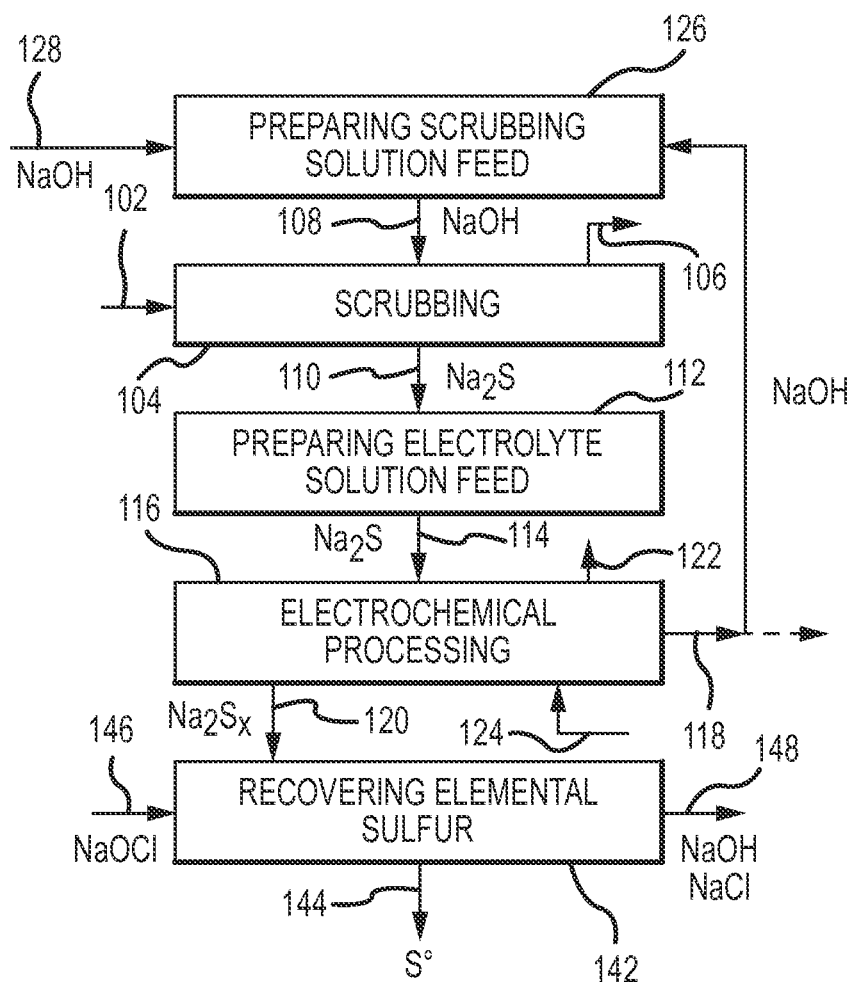

Reference is now made to FIGS. 4-7 in relation to some example implementations in relation to use of sodium hydroxide as a capture agent. With reference first to FIG. 4, during the preparing scrubbing solution feed 126, the feed aqueous liquid 108 is prepared including sodium hydroxide dissolved therein as a capture agent, using sodium hydroxide recycled from the catholyte product 118 from the electrochemical processing 116 and supplemented as needed by sodium hydroxide in the fresh feed 128 capture agent. For illustration purposes, FIG. 4 is described in relation to a feed gas stream 102 from which hydrogen sulfide is to be scrubbed with no or minimal scrubbing of carbon dioxide during the scrubbing 104. For example, this situation may occur when the feed gas stream 102 contains hydrogen sulfide, but no or little carbon dioxide. Also, when carbon dioxide is present, if not present in great excess relative to hydrogen sulfide, hydrogen sulfide will tend to be preferentially captured due to its generally higher reactivity with alkali metal hydroxide and alkali metal carbonate capture agents.

As shown in FIG. 4, during the scrubbing 108 sulfur of hydrogen sulfide removed from the feed gas stream 102 is captured in the pregnant scrubbing solution 110. In the implementations illustrated in FIG. 4, most, essentially all or all of the captured sulfur may be in the form of sodium sulfide. This may be the case for example, when the scrubbing 104 is conducted at pH of 12 or higher, as noted previously. For some implementations shown in FIG. 4, it may be desired that essentially all such captured sulfur be in the form of sodium sulfide in the feed of electrolyte solution 114, and the preparing electrolyte solution feed 112 may include simply transferring the pregnant scrubbing solution 110 to the electrochemical processing 116 for use as the feed of electrolyte solution 114. After the electrochemical processing 116, the anolyte product 120, including sodium polysulfide is provided to the recovering elemental sulfur 142, during which elemental sulfur ($S^o$) precipitate is formed through oxidation using the oxidizing agent 146 and to prepare the elemental sulfur product 144. The implementations of FIG. 4 are illustrated using sodium hypochlorite in the oxidizing agent 146, accordingly showing the treated effluent liquid 148 containing sodium hydroxide and sodium chloride, which result from the oxidation of the polysulfide during the recovering elemental sulfur 142. Such sodium hypochlorite as supplied to the recovering elemental sulfur 142 may be in any convenient form, for sample in a solution that may also include dissolved sodium chloride salt. A portion of the treated effluent liquid 148 may be recycled for use of the sodium hydroxide in that stream in the processing, provided that excessive sodium chloride is prevented from building up within the system. Alternatively, the treated effluent liquid 148 may be subjected to further processing to regenerate sodium hypochlorite oxidizing agent. For example, the treated sodium chloride in the effluent liquid 148 may be subjected to electrochemical processing to prepare sodium hydroxide and chlorine gas, which may be separately collected and reacted to regenerate sodium hypochlorite, according to known processing techniques.

Figure 5:
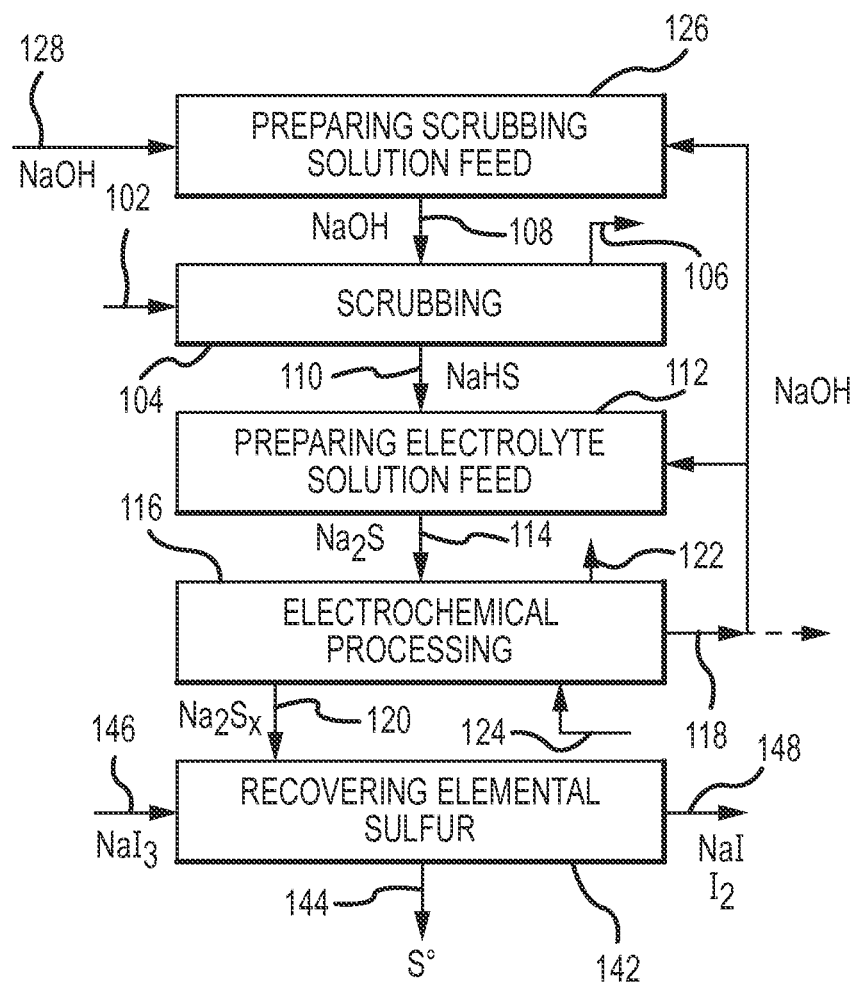

Reference is now made to FIG. 5 illustrating other implementations in which hydrogen sulfide is to be scrubbed preferably with no or minimal scrubbing of carbon dioxide. A main difference in the processing shown in FIG. 5 relative to FIG. 4 is that the scrubbing 104 is conducted at a lower pH, for example in a range of pH9 to pH 11.5, so that most, essentially all or all of the captured sulfur from hydrogen sulfide removed from feed gas stream 102 is in the form of sodium hydrosulfide in the pregnant scrubbing solution 110. Rather than recycling all of the sodium hydroxide from the catholyte product 118 to the preparing scrubbing solution feed 126, a portion of such sodium hydroxide is provided to the preparing electrolyte solution feed 112 to increase the pH of the aqueous liquid during that operation, and causing captured sulfur in the form of sodium hydrosulfide in the pregnant scrubbing solution 110 to be converted to the form of sodium sulfide in the feed of electrolyte solution 114. Processing in the recovering elemental sulfur 142 may be similar to that shown in FIG. 4. However, for illustration purposes, the implementations shown in FIG. 5 are shown using sodium triiodide in the oxidizing agent 146, and the treated effluent 148 includes sodium iodide and other iodine species. Such treated effluent liquid 148 may be further processed to regenerate the sodium triiodide oxidizing agent, for example, by electrochemical processing to convert the sodium iodide and elemental iodine back to sodium triiodide, according to known processing techniques.

With continued reference to FIGS. 4 and 5 it will be appreciated that intermediate processing may be accomplished between the situations described with respect to FIG. 4 where most of the sulfur may be initially captured as sodium sulfide and FIG. 5 where most of the sulfur may be initially captured in the form of sodium hydrosulfide. Such intermediate processing may include any ratio of sodium sulfide to sodium hydrosulfide in the pregnant scrubbing solution 110, which may be adjusted to any desired higher ratio for the feed of electrolyte solution 114.

Figure 6:
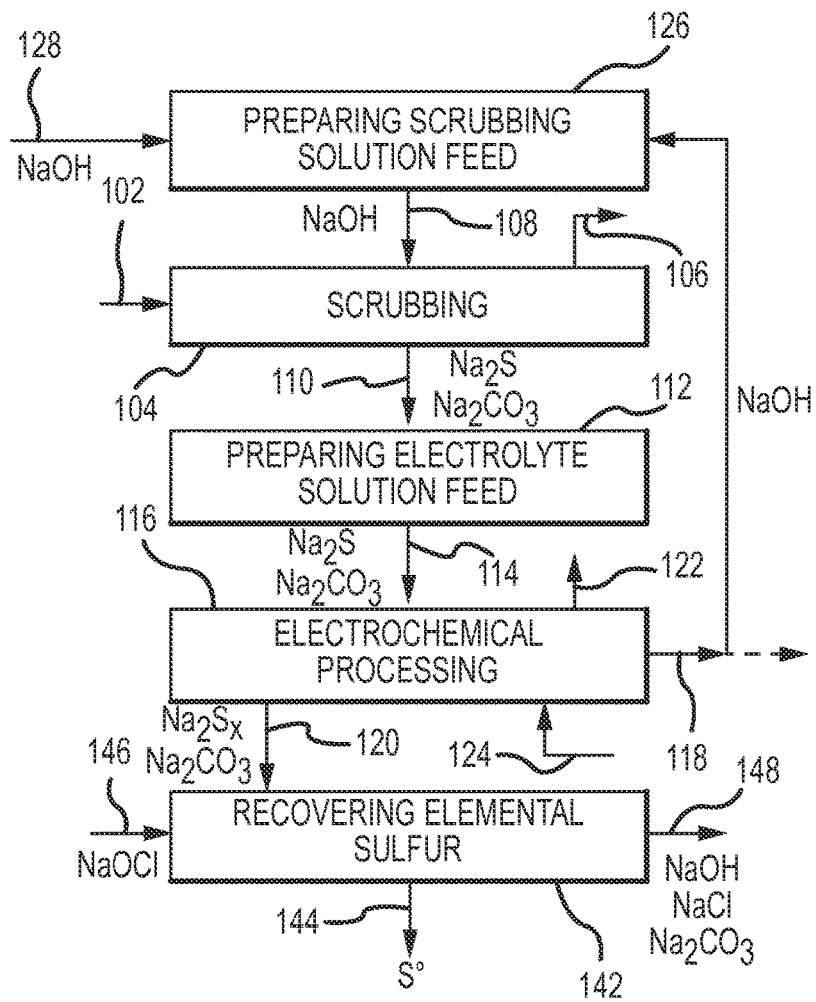
Figure 7:
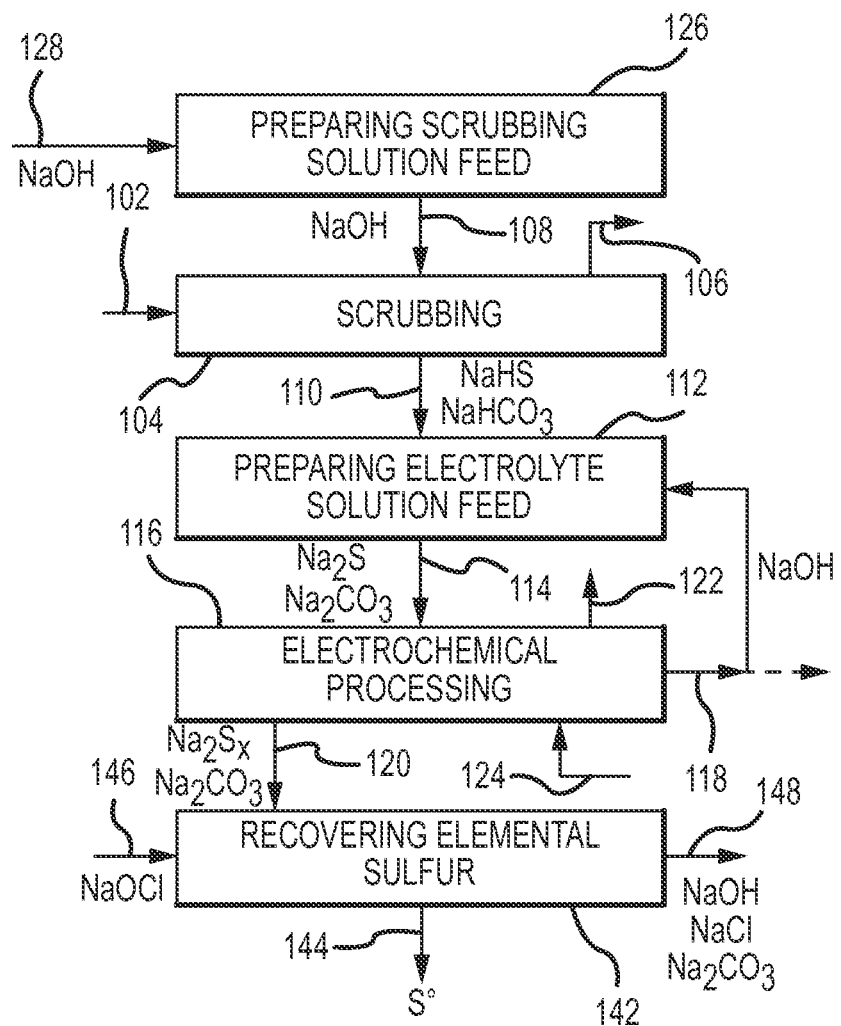

Reference is now made to FIGS. 6 and 7 with respect to examples of some implementations using sodium hydroxide as the main sulfur capture agent to capture both hydrogen sulfide and carbon dioxide from the feed gas stream 102. As with FIG. 4, in the processing illustration of FIG. 6, all of the sodium hydroxide of the catholyte product 118 is recycled for use in the preparing scrubbing solution feed 126 to prepare the feed of aqueous liquid 108 and with most, essentially all or all of the sulfur from hydrogen sulfide removed from the feed gas stream 102 being captured in the pregnant scrubbing solution 110 in the form of sodium sulfide. Likewise, most, essentially all or all of the carbon dioxide removed from the feed gas stream 102 during the scrubbing 104 is captured in the pregnant scrubbing solution 110 in the form of sodium carbonate. In these illustrated implementations, the feed of electrolyte solution 114 is to have captured sulfur and carbon dioxide in the forms of sodium sulfide and sodium carbonate, respectively, and the preparing electrolyte solution feed 112 as shown in FIG. 6 may simply involve transferring the pregnant scrubbing solution 110 from the scrubbing 104 to the electrochemical processing 116 for direct use as the feed of electrolyte solution 114. The anolyte product 120 from the electrochemical processing includes sodium polysulfides and sodium carbonate, the sodium carbonate being essentially inert in the electrochemical processing. The recovering elemental sulfur 142 is conducted using sodium hypochlorite in the oxidizing agent, similar to processing shown in FIG. 4. In the implementations illustrated in FIG. 6, because of the capture of carbon dioxide the treated effluent liquid 148 will include sodium carbonate in addition to sodium hydroxide and sodium chloride. As discussed with respect to FIG. 4, such sodium hypochlorite oxidizing agent may be regenerated using electrochemical processing.

Referring now to FIG. 7, some implementations are illustrated in which hydrogen sulfide and the carbon dioxide are scrubbed from the feed gas stream 102, but at a pH so that most, essentially all or all of the captured sulfur is in the form of sodium hydrosulfide and most, essentially all or all of the captured carbon dioxide is the form of sodium bicarbonate, using sodium hydroxide as a primary capture agent. Similar to the processing shown in FIG. 5, the scrubbing is run at lower pH so that in the pregnant scrubbing solution 110, includes mostly sodium hydrosulfide and sodium bicarbonate, and with little or no sodium sulfide or sodium bicarbonate. As shown in FIG. 7, sodium hydroxide in the catholyte product 118 is provided to the preparing electrolyte solution feed 112 to adjust the pH of the aqueous liquid to prepare the feed of electrolyte solution 114, in which most, essentially all or all of the captured sulfur is in the form of sodium sulfide and most, essentially all or all of the captured carbon dioxide is in the form of sodium carbonate. The electrochemical processing 116 and recovering elemental sulfur 142 as illustrated in the implementations of FIG. 7 are similar to as shown and described with respect to FIG. 6.

Similar to the discussion above concerning FIGS. 4 and 5, intermediate processing between the illustrated processing in FIGS. 6 and 7 may be performed in which the pregnant scrubbing solution 110 may have a molar ratio of sodium sulfide to sodium hydrosulfide and a molar ratio of sodium carbonate to sodium bicarbonate that are intermediate between the situations described with respect to FIGS. 6 and 7, with such ratios being adjusted to higher molar ratios in the feed of the electrolyte solution 114, for example with most, essentially all or all of the captured sulfur in the form of sodium sulfide and most or all of the captured carbon dioxide in the form of sodium carbonate in the feed of electrolyte solution 114.

Same example, implementations involving the use of alkali metal carbonate as a capture agent will now be described with reference to FIGS. 8-13. Again the discussion will be exemplified by the use of sodium as the alkali metal, but the discussion applies equally to the use of other alkali metals, for example, potassium or lithium. The example implementations are described for processing in which sodium carbonate is the primary capture agent, although the processing also applies to the use of mixed carbonate and hydroxide capture agents.

Figure 8:
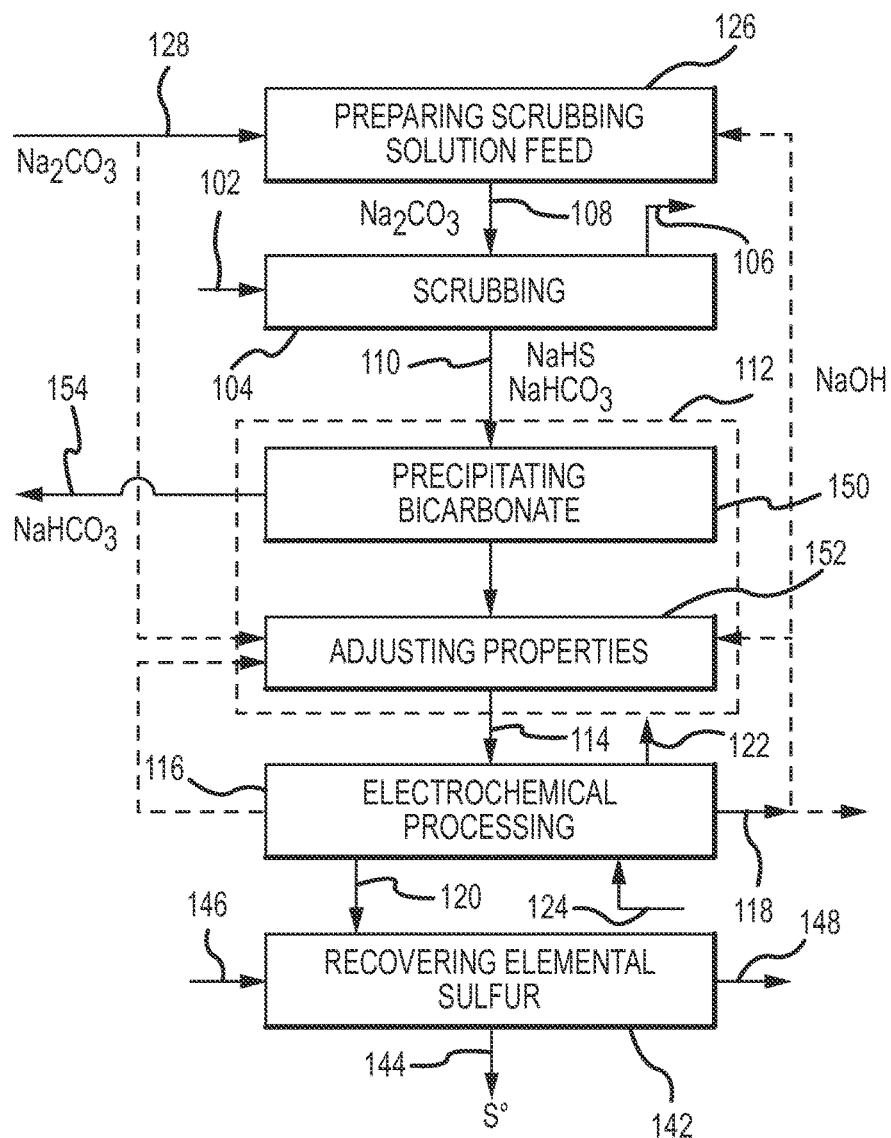

FIG. 8 shows generalized processing using sodium carbonate capture agent for scrubbing hydrogen sulfide alone or for scrubbing both hydrogen sulfide and carbon dioxide. As shown in FIG. 8, during the preparing scrubbing solution feed 126, the feed of aqueous liquid 108 is prepared to include sodium carbonate as a capture agent. During the scrubbing 104, sulfur of hydrogen sulfide removed from the feed gas stream 102 is captured in the aqueous liquid in a form of sodium hydrosulfide. The pregnant scrubbing solution 110 will include such sodium hydrosulfide and also will include sodium bicarbonate, whether or not the system is also scrubbing carbon dioxide from the feed gas stream 102. However, when scrubbing both hydrogen sulfide and carbon dioxide, more sodium bicarbonate will be present in the scrubbing solution, because each hydrogen sulfide that is captured results in a single sodium bicarbonate in solution, whereas each carbon dioxide that is captured results in two sodium bicarbonates in solution. In the processing implementations illustrated in FIG. 8, the preparing electrolyte solution feed 112 includes precipitating bicarbonate 150 from the aqueous liquid followed by adjusting properties 152 of the aqueous liquid to prepare the feed of electrolyte solution 114 that is supplied to the electrochemical processing 116. Precipitating sodium bicarbonate may, for example, result from cooling the pregnant scrubbing solution to a reduced temperature at which the solubility of sodium bicarbonate is lower and sodium carbonate accordingly precipitates from the aqueous liquid. For example, the temperature of the aqueous liquid may be reduced from a first temperature of at least 40° C., at least 50° C., at least 60° C. or at least 70° C. to a second, lower temperature of lower than 10° C. or lower than 5° C. During the precipitating bicarbonate 150, at least some of the sodium bicarbonate in the pregnant scrubbing solution 110 is precipitated and removed from the aqueous liquid by any suitable solid liquid-separation technique, such as by filtration, settling and decantation, flotation or other technique. As shown in FIG. 8, a separated sodium bicarbonate precipitate 154 is recovered from the precipitating bicarbonate 150, such as by such solid-liquid separation techniques. The precipitation and removal of a significant quantity of the sodium bicarbonate from the aqueous liquid provides significant flexibility for an efficient operation of the process in a number of different situations, some of which will be illustrated with reference to FIGS. 9-13. The sodium bicarbonate removed from solution during the precipitating bicarbonate 150 will beneficially reduce the amount of sodium bicarbonate that will need to be processed during subsequent processing.

Figure 9:
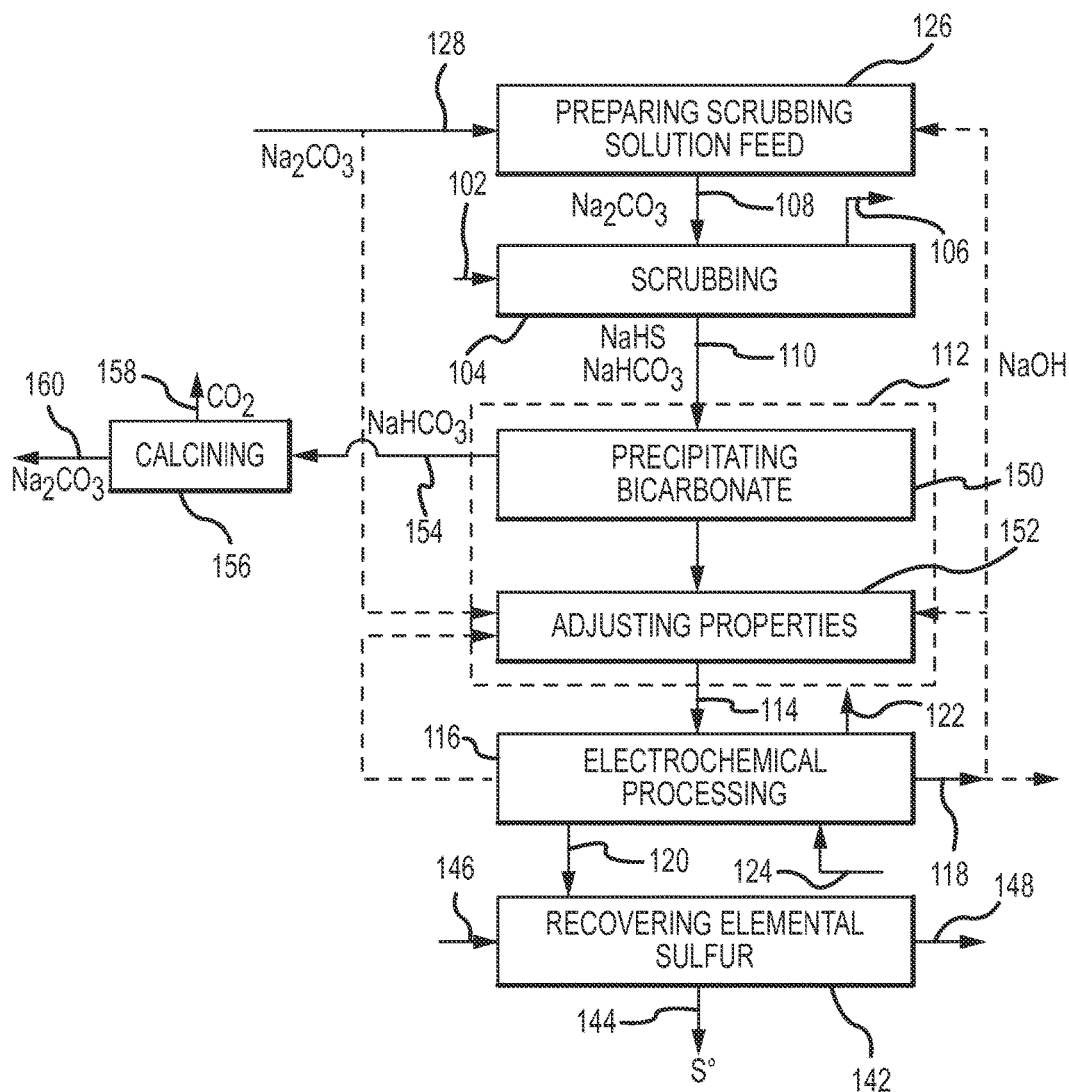
Figure 10:
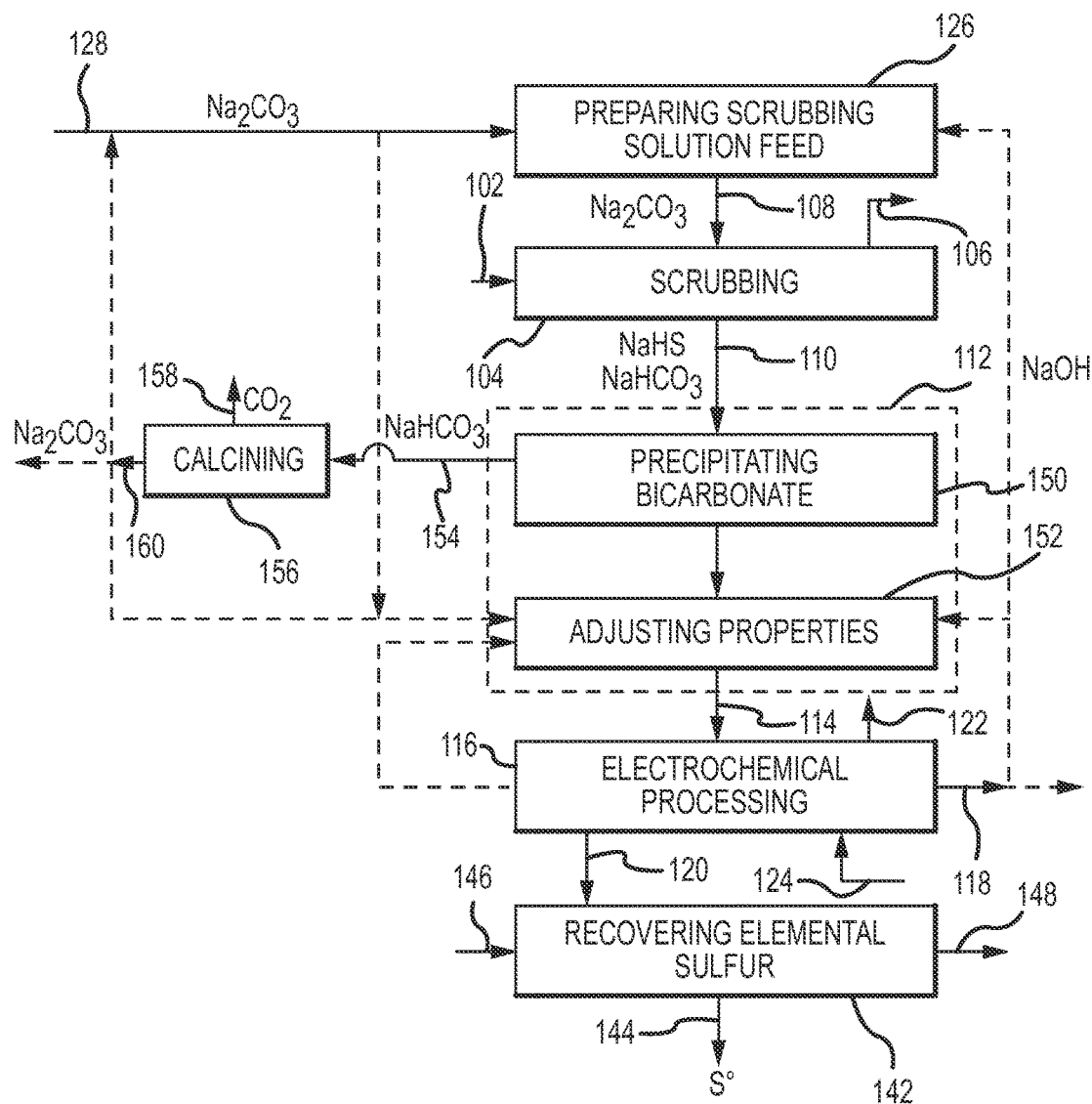

With reference to FIG. 9, the same general processing as shown in FIG. 8 is also shown in FIG. 9, except that in FIG. 9, the separated precipitate 154 of sodium bicarbonate is subjected to calcining 156 in which the separated sodium bicarbonate 154 is heated to drive off carbon dioxide 158 and convert the sodium bicarbonate to sodium carbonate 160. Thermal processing to calcine sodium bicarbonate to drive off carbon dioxide and prepare sodium bicarbonate is well known. Such calcining 156 may be performed in a dry process, such as may be performed in a rotary kiln or other solid treatment apparatus, or may be performed in a wet process, such as in a tank or other liquid-containment vessel with the sodium carbonate in a slurry or re-dissolved in a form of a solution, which may result in the sodium carbonate 160 being a slurry or solution form. For example, the sodium bicarbonate may be in solution and as carbon dioxide is liberated from the solution on heating, the dissolved sodium bicarbonate may convert to dissolved sodium carbonate during the calcining 156. The calcining 156 provides significant flexibility to recycle some or all of the sodium carbonate 160 to supplement the fresh feed 128 of capture agent, to the adjusting properties 152 or to other parts of the process. FIG. 10 shows the same general processing as FIG. 9, except also showing generally the possibility for providing some or all of the sodium carbonate 160 from the calcining 156 to the preparing scrubbing solution 126 along with the fresh feed 128 of capture agent or to the adjusting properties 152 to assist in the preparation of the feed of electrolyte solution 114 with desired properties for the electrochemical processing 116.

Figure 11:
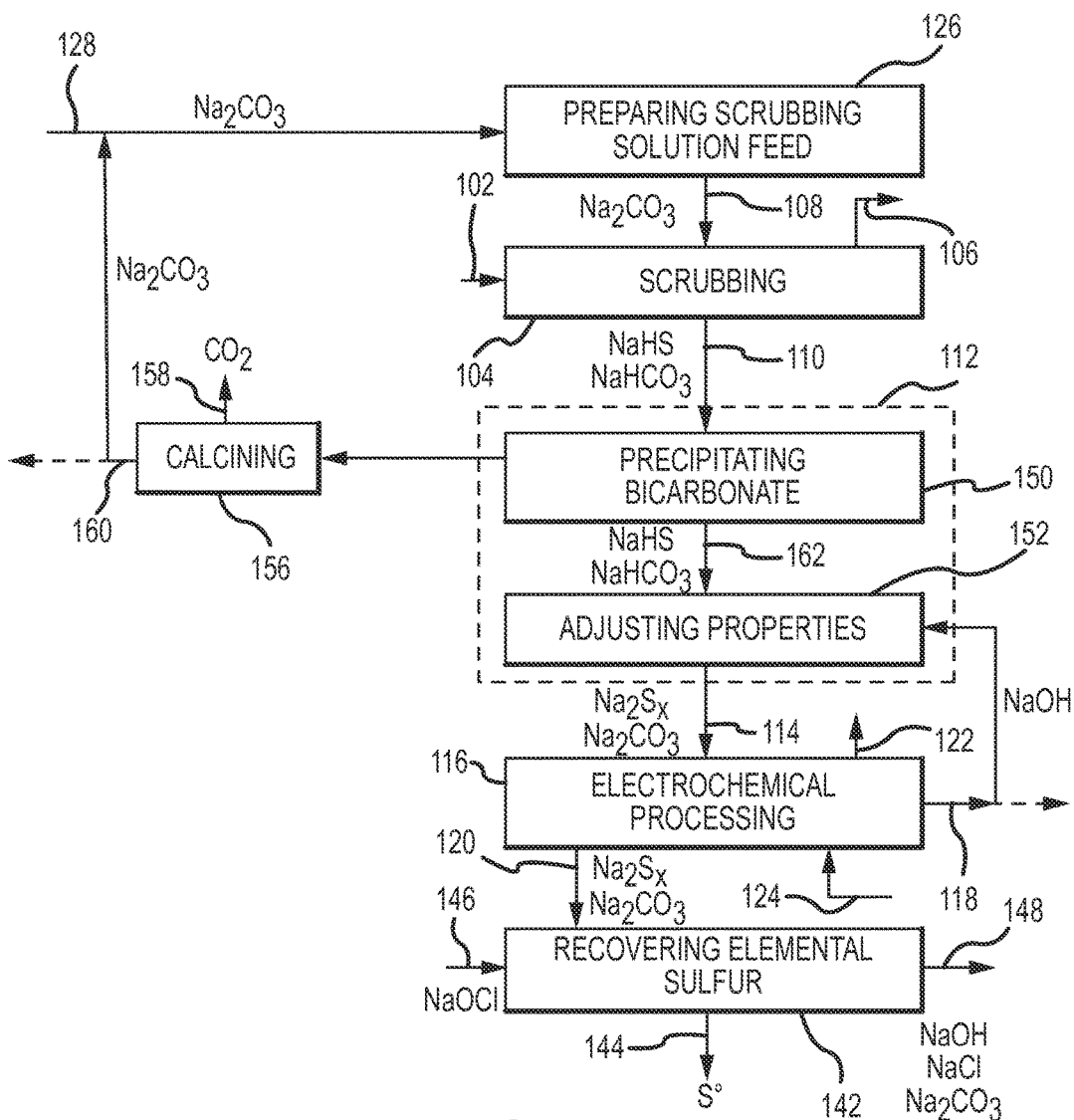

Reference is now made to FIG. 11, which illustrates some more specific example implementations that may be used when processing a gas stream to remove hydrogen sulfide, with or without removal also of carbon dioxide. As shown in FIG. 11, the feed of aqueous liquid 108 to the scrubbing 104 includes sodium carbonate capture agent for capturing hydrogen sulfide or for capturing hydrogen sulfide and carbon dioxide from the feed gas stream 102. Sulfur of the hydrogen sulfide that is removed from the feed gas stream 102 is captured with most, essentially all or all of the captured sulfur in a form of sodium hydrosulfide, resulting in the production also of sodium bicarbonate. Capture of carbon dioxide also generates sodium bicarbonate, as discussed previously. The pregnant scrubbing solution 110 including sodium hydrosulfide and sodium bicarbonate is provided to the preparing electrolyte solution feed 112, where it is subjected to the precipitating bicarbonate 150 to precipitate sodium bicarbonate and precipitated bicarbonate is then separated from at least a portion, and preferably most of the aqueous liquid. The treated aqueous liquid 162 from the precipitating bicarbonate 150 includes sodium hydrosulfide and sodium bicarbonate, with sodium bicarbonate preferably present at a significantly lower concentration than in the pregnant scrubbing solution 110. The treated aqueous liquid 162 is then subjected to the adjusting properties 152 where sodium hydroxide from the catholyte product 118 is used to adjust upward the pH of the aqueous liquid, resulting in conversion of at least a portion, and preferably most, essentially all or all of the sodium hydrosulfide to sodium sulfide, so that the feed of the electrolyte solution 114 includes a much higher molar ratio of sodium sulfide to sodium hydrosulfide than in the pregnant scrubbing solution 110 or in the treated aqueous liquid 162. During the adjusting properties 152, at least some, and often most or essentially all, of the sodium bicarbonate is converted to sodium carbonate. The anolyte product 118 from the electrochemical processing 116 will include sodium polysulfides and sodium carbonate. For illustration purposes, sodium hypochlorite is shown for use in the oxidizing agent 146 in the recovering elemental sulfur 142, and the treated effluent liquid 148 from the recovering elemental sulfur 142 includes sodium hydroxide, sodium chloride and sodium carbonate in this example. Also, in the processing shown in FIG. 11 most or all of the sodium carbonate 160 from calcining 156 is recycled to the preparing scrubbing solution feed 126 to supplement the fresh feed 128 of capture agent. Sufficient fresh sodium carbonate feed will be needed to at least compensate for sodium carbonate removed from the system in the treated effluent liquid that is not further processed for recycle in the system.

Figure 12:
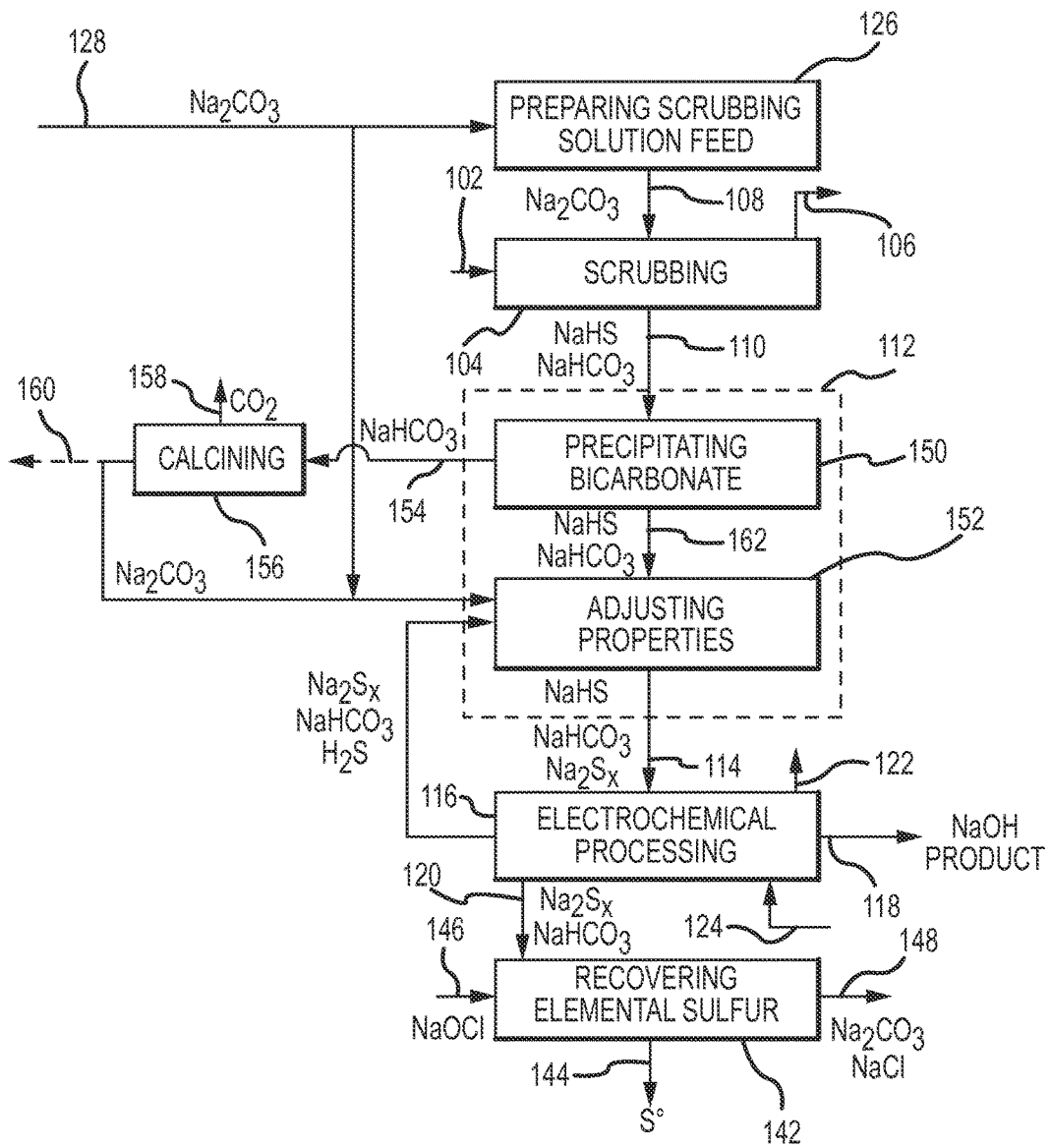
Figure 13:
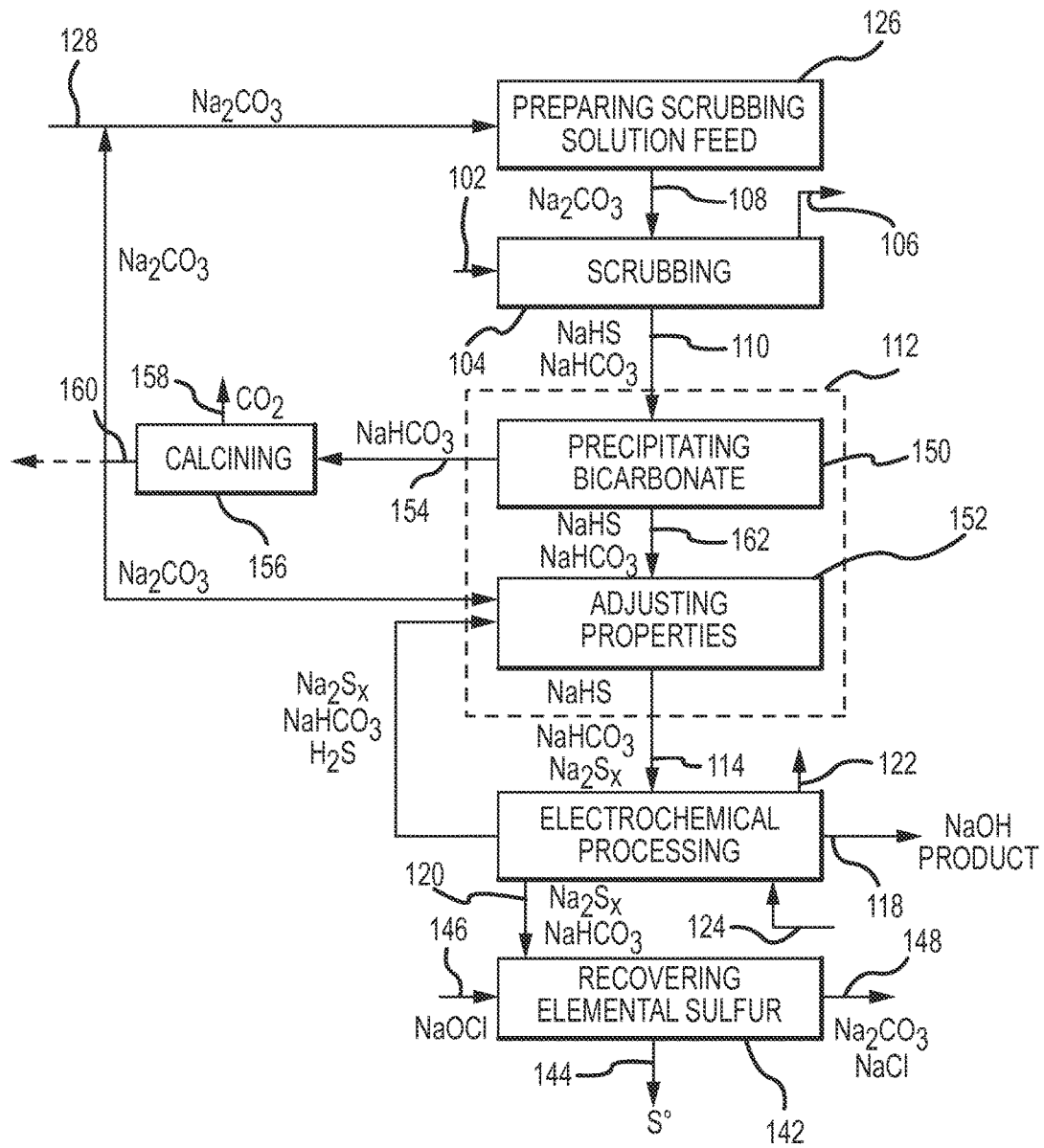

Reference is now made to FIGS. 12 and 13 for some example implementations in which an alkali metal carbonate feed may be used to scrub hydrogen sulfide alone or to scrub both hydrogen sulfide and carbon dioxide, with preparation and recovery of a clean alkali metal hydroxide product as a value product rather than using such hydroxide in the process. FIGS. 12 and 13 are presented with all of the hydroxide in the catholyte product 118 being recovered and reserved as such a valuable product. In alternative processing, however, a portion of the catholyte product 118 may be reserved as such a valuable product, and the remaining portion of the catholyte product 118 may be recycled for use in the process, for example as shown in FIG. 11. Such alkali metal hydroxide is a valuable product and in some situations process economics may be significantly enhanced through sale of such a product, relative to a lower cost of alkali metal carbonate feed that may be consumed to produce the alkali metal hydroxide product. Such carbonate feed may, for example, be sourced from an industrial waste product or may be sourced from a mined material, such as from trona. Feed to the operation may be in the form of trona, which may then be calcined to form sodium carbonate at the site for use as the fresh feed 128. Alternatively, an already calcined product may be obtained as feed, for example to reduce shipping costs due to lower weight. Feed material in the form of calcined trona, whether or not produced on site or shipped in calcined form, may be particularly advantageous for many applications given the relatively low cost of trona in raw mineral form or in calcined form as sodium carbonate compared to the value of sodium hydroxide product.

Referring now to FIG. 12, some process implementations are illustrated for scrubbing substantially only hydrogen sulfide or for scrubbing hydrogen sulfide together with a relatively small amount of carbon dioxide. As shown in FIG. 12, the feed of aqueous liquid 108 includes sodium carbonate capture agent. The pregnant scrubbing solution 110 includes captured sulfur of such hydrogen sulfide removed from the gas stream feed 102 in the form primarily of sodium hydrosulfide and the pregnant scrubbing solution 110 also includes sodium bicarbonate, as a consequence of hydrogen sulfide capture and of carbon dioxide capture when carbon dioxide is being scrubbed. During the preparing electrolyte solution feed 112, no hydroxide is provided from the catholyte product 118 to assist in adjusting properties of the aqueous liquid following the precipitating bicarbonate 150. Rather, sodium carbonate from the calcining 156, supplemented with additional sodium carbonate from the fresh feed 128, is provided to the adjusting properties 152 to adjust the pH upward, which will also tend to shift a larger proportion of captured sulfur to the form of sodium sulfide rather than sodium hydrosulfide. Also, as shown in FIG. 12, some materials from an anode side of the electrochemical processing 116 are recycled. Such recycled materials include sodium polysulfides, sodium bicarbonate and hydrogen sulfide, which may be generated during the electrochemical processing 116 as a consequence of the feed of electrolyte solution 114 including primarily sodium hydrosulfide, as opposed to sodium sulfide as shown in FIG. 11. Although only a single recycled line is shown in FIG. 12, the hydrogen sulfide may be recycled in the form of a gas stream generated from a cathode region of the electrochemical processing 116. The sodium polysulfides and sodium bicarbonate may be provided by recycling a portion of anolyte liquid, which may be of the same composition as the anolyte product 120. The sodium polysulfide recycled to the adjusting properties 152 may react with such hydrogen sulfide to capture the sulfur from that hydrogen sulfide in the form of shorter-chain polysulfides in the feed of electrolyte solution 114. The catholyte product 118 including sodium polysulfide and sodium bicarbonate is provided to the recovering elemental sulfur 142. For illustration purposes, the oxidizing agent is shown as including sodium hypochlorite, and the treated effluent liquid 148 includes sodium carbonate and sodium chloride. As with other processing, such sodium carbonate in the treated effluent liquid 148 may be purged from the system or the treated effluent liquid 148 may be processed to recover sodium carbonate in a form permitting at least some of the sodium carbonate to be recycled.

Reference is now made to FIG. 13 illustrating some other example implementations in which hydrogen sulfide and carbon dioxide are both scrubbed from the feed gas stream 102 and with recovery and reservation of a alkali metal hydroxide product, similar to processing in FIG. 12, but which may be preferred over processing shown in FIG. 12 for some situations, for example when scrubbing larger proportions of carbon dioxide relative to hydrogen sulfide that will result in more sodium bicarbonate in the system relative to sodium hydrosulfide and a corresponding larger quantity of separated precipitate 154 of sodium bicarbonate processed through the calcining 156 to produce larger quantities of the sodium carbonate 160. In the processing shown in FIG. 13, a portion of the sodium carbonate 160 from the calcining 156 is provided to the preparing scrubbing solution feed 126 along with fresh feed 128 of sodium carbonate. Another portion of the sodium carbonate 160 from the calcining 156 is provided to the adjusting properties 152. Processing in the adjusting properties 152 and through recovery of elemental sulfur 154 is similar to as described with FIG. 12. Similar to as shown in FIG. 12, FIG. 13 shows all of the sodium hydroxide in the catholyte product 118 being reserved as a valuable product rather than being reused within the system. As will be appreciated, intermediate processing between that described with respect to FIGS. 12 and 13 is possible, with varying proportions of hydrogen sulfide and carbon dioxide being scrubbed.

Various variations, which may include a variety of refinements and/or additional features, may be applicable to the various processing summarized in FIGS. 1-13 and the accompanying description provided above, and one or more of such variations may be used in any combination together and in combination with any of the processing of FIGS. 1-13.

In one variation, at least a portion of polysulfide in anolyte from the electrochemical processing may be provided to the preparing scrubbing solution feed 126 for use to make the feed of scrubbing solution 108. The feed of scrubbing solution 108 may thus include dissolved polysulfide, which is available to react with and capture hydrogen sulfide, in a manner similar to reaction with hydrogen sulfide that may be recycled from the electrochemical processing 116 to the adjusting properties 152, shown in and described in relation to FIGS. 12 and 13.

In another variation, the electrochemical processing may be conducted under conditions (e.g., voltage, current, time) so that very little or no sulfur in dissolved species in the anolyte is oxidized to sulfur oxyanion form. In some implementations, anolyte during the electrochemical processing (and also the anolyte product 120) may have no more than 1 molar percent or even no more than 0.1 molar percent of sulfur in dissolved species in the anolyte is in sulfur oxyanion form. Sulfur oxyanions are anions containing sulfur and oxygen, for example sulfate, sulfite, thiosulfate, thionates (e.g., dithionate or other polythionates). By sulfur oxyanion form, it is meant sulfur contained as a component in solution in the anolyte in any sulfur oxyanions present in the anolyte.

In another variation, the electrochemical processing 116 could include the use of an anti-fouling agent in the electrolyte solution in the reactor, for example to help reduce potential for fouling of the anode in the event that elemental sulfur precipitate may form in an anode region of an electrochemical reactor. Examples of such a anti-fouling agent include cationic surfactants, for example hexadecyltrimethylammonium bromide (HTAB). Such an anti-fouling agent could, for example, be included in the electrolyte solution feed or added separately to the electrochemical reactor, typically at a low concentration, for example from 1 millimole per liter to 100 millimoles per liter.

In another variation, the capture agent (e.g., alkali metal hydroxide and/or alkali metal carbonate) may be in a solid form, and the gas may be contacted with such solid form material to effect capture removal of the hydrogen sulfide and capture of sulfur from such hydrogen sulfide, for example in a form of alkali metal hydrosulfide and/or alkali metal sulfide. For example, an alkaline sorbent may include such solid alkaline material, such as pellets or other solid form of alkali metal hydroxide or alkali metal hydroxide. Such solid form alkaline material may be uniform in composition (e.g., pure capture agent) or may be multiphasic, for example including the capture agent intermixed with or supported by another material. When such a solid form alkaline material is used, the captured sulfur may be initially in a solid form of alkali metal hydrosulfide and/or sulfide, which may be dissolved from a column or other contacting apparatus into solution in an aqueous liquid to form the pregnant scrubbing solution 110 for processing as shown in any of FIGS. 1-13. Likewise with respect to capture of carbon dioxide, which may also be initially captured in a solid phase captured form and then dissolved into solution in aqueous liquid to form such a pregnant scrubbing solution 110.

In another variation, processing may include precipitation of alkali metal carbonate, either in the case of scrubbing hydrogen sulfide alone or in the case of scrubbing hydrogen sulfide and carbon dioxide. For example, in the processing of any of FIGS. 3-13, sodium carbonate as shown in and described in relation to the figures may be precipitated from the treated effluent liquid 148, for example by chilling. Such precipitation of sodium carbonate may be performed with also precipitating sodium bicarbonate, for example when the solution being treated does not contain appreciable sodium bicarbonate. Alternatively, sodium carbonate and sodium bicarbonate may be precipitated together, for example during the precipitating bicarbonate 150 as shown in FIGS. 8-13. As another alternative, the preparing electrolyte solution feed 112 may include precipitation of sodium carbonate following precipitation of sodium bicarbonate, for example during the adjusting properties 152, which could include first adjusting pH to convert most or all sodium bicarbonate to sodium carbonate, followed by chilling to precipitate at least some of the sodium carbonate. The precipitate may be in the form of sodium carbonate decahydrate. Similar processing may also be used to precipitate potassium carbonate decahydrate. Such precipitation may be performed for example by chilling a solution, for example to a temperature of at least 10° C., at least 5° C., at least 0° C. or even lower. Such precipitated alkali metal decahydrate may be recycled to supplement fresh feed 128. An advantage of processing to precipitate sodium carbonate during the preparing electrolyte solution feed is that such decahydrate precipitate also removes water from the aqueous liquid, which concentrates the remaining sodium hydrosulfide and/or sodium sulfide in the remaining portion of the aqueous liquid in advance of the electrochemical processing 116. For example, sodium carbonate may be precipitated as the decahydrate salt, which is sensitive to the common ion effect in the presence of other dissolved sodium salts. In one example, sodium carbonate and/or sodium bicarbonate may be precipitated from a 5% or greater concentrated solution of NaHS and/or Na$_2$S upon chilling to a temperature of about 5° C. or lower. For example, essentially all of the sodium carbonate and/or sodium bicarbonate may be removed when NaHS concentration is greater than 5% and the temperature is reduced to about 0° C. or lower. As another example, the preparing electrolyte solution feed 112 in the processing illustrated in any of the figures in which alkali metal carbonate and/or bicarbonate is present in the pregnant scrubbing solution 110 may include such precipitating of alkali metal carbonate.

Some example implementation combinations, and for various types of implementation applications, which may be the subject of claims with or without additional features as disclosed above, are disclosed as follows:

1. A method to prepare one or more chemical products using hydrogen sulfide, the method comprising:

scrubbing hydrogen sulfide from a gas stream and preparing an aqueous liquid comprising sulfur from at least a portion of the hydrogen sulfide removed from the gas stream captured in the aqueous liquid in dissolved material selected from the group consisting of alkali metal sulfide, alkali metal hydrosulfide and combinations thereof;

preparing a feed of electrolyte solution comprising at least a portion of the aqueous liquid including at least a portion of the captured sulfur in a form of such dissolved material;

electrochemical processing the feed of electrolyte solution to generate in an electrochemical reactor dissolved alkali metal hydroxide in catholyte and dissolved polysulfide in anolyte, wherein the dissolved polysulfide comprises at least a portion of the captured sulfur.

recovering at least a portion of the anolyte comprising dissolved polysulfide from the electrochemical reactor.

2. A method according to example implementation combination 1, comprising treating at least a portion of the recovered anolyte outside of the electrochemical reactor to convert at least a portion of sulfur of the polysulfide into elemental sulfur precipitate.

3. A method according to example implementation combination 2, comprising after the treating:

separating the elemental sulfur precipitate from the treated anolyte.

4. A method according to example implementation combination 3, comprising after the separating preparing a dried elemental sulfur product including at least a portion of the elemental sulfur precipitate and disposing the dried elemental sulfur product in a container for transportation.

5. A method according to either one of example implementation combination 3 or example implementation combination 4, wherein the treating comprises contacting at least a portion of the recovered anolyte with an oxidizing agent to oxidize sulfur in the polysulfide to elemental sulfur.

6. A method according to example implementation combination 5, wherein the oxidizing agent comprises one or more of an alkali metal hypochlorite, alkaline earth metal hypochlorite, hydrogen peroxide, an alkali metal ferricyanide, sulfur dioxide gas, alkali metal metabisulfite, alkali metal trihalogenide and oxygen gas.

7. A method according to either one of example implementation combination 5 or example implementation combination 6, comprising after the separating:

regenerating the oxidizing agent, comprising subjecting at least a portion of the treated anolyte to electrochemical processing; and wherein the oxidizing agent comprises a member selected from the group consisting of sodium hypochorite, alkali metal ferricyanide and alkali metal trihalogenide.

8. A method according to any one of example implementation combinations 1-7, wherein the recovered anolyte comprises no more than 1 parts per million by weight of elemental sulfur.

9. A method according to any one of example implementation combinations 1-8, wherein no more than 1 molar percent of sulfur in dissolved species in the anolyte is in sulfur oxyanion form.

10. A method according to any one of example implementation combinations 1-9, wherein the electrochemical processing is operated to oxidize the captured sulfur in the electrochemical reactor to a maximum state of oxidation that is lower than elemental sulfur, to prevent precipitation of elemental sulfur in the electrochemical reactor during the electrochemical processing.

11. A method according to any one of example implementation combinations 1-10, comprising preparing a feed of the aqueous liquid as fed to the scrubbing, wherein the feed of the aqueous liquid includes at least a portion of the polysulfide of the recovered anolyte.

12. A method according to any one of example implementation combinations 1-11, wherein the recovered anolyte has a pH in a range of from pH 10 to pH 14.

13. A method according to any one of example implementation combinations 1-12, wherein the recovered anolyte is essentially free of elemental sulfur precipitate prior to the treating.

14 A method according to any one of example implementation combinations 1-13, wherein the preparing a feed of electrolyte solution comprises:

increasing pH of the at least a portion of the aqueous liquid.

15. A method according to example implementation combination 14 wherein the increasing pH comprises increasing the pH from a first pH in a range of from pH 9 to pH 11 to a second pH in a range of from pH 12 to pH 14.

16. A method according to any one of example implementation combinations 1-15 and 43-45, wherein the preparing a feed of electrolyte solution comprises:

increasing a ratio of concentration of dissolved alkali metal sulfide to concentration of dissolved alkali metal hydrosulfide in the at least a portion of the aqueous liquid.

17. A method according to example implementation combination 16, wherein the increasing a ratio comprises increasing the ratio from a first ratio of not larger than 1:10 to a second ratio of at least 1:1 or larger.

18. A method according to any one of example implementation combinations 1-17 and 43-45, wherein the preparing the feed of electrolyte solution comprises adding at least a portion of the hydroxide recovered from the electrochemical processing to the at least a portion of the aqueous liquid.

19. A method according to any one of example implementation combinations 1-18 and 43-45, wherein the feed of the electrolyte solution comprises a ratio of alkali metal sulfide to alkali metal hydrosulfide of at least 1:1.

20. A method according to any one of example implementation combinations 1-19 and 43-45, wherein the feed of the electrolyte solution has a pH in a range of from pH 10 to pH 14.

21. A method according to any one of example implementation combinations 1-20 and 43-45, wherein the scrubbing comprise contacting the gas stream with an alkaline sorbent to capture sulfur from at least a portion of hydrogen sulfide removed from the gas stream during the scrubbing.

22. A method according to example implementation combination 21, wherein during the alkaline sorbent comprises solid alkaline material.

23. A method according to any one of example implementation combinations 1-20 and 43-45, wherein the scrubbing comprises contacting the aqueous liquid comprising a capture agent with gas of the gas stream.

24. A method according to any one of example implementation combinations 1-23 and 43-45, comprising preparing a feed of the aqueous liquid as fed to the scrubbing, wherein the feed to the aqueous scrubbing includes hydroxide recovered from the electrochemical processing.

25. A method according to any one of example implementation combinations 1-24 and 43-45, wherein the gas stream comprises carbon dioxide and the method comprises:
scrubbing carbon dioxide from the gas stream into the aqueous liquid to capture carbon dioxide in the aqueous liquid in dissolved carbonate material selected from the group consisting of alkali metal carbonate, alkali metal bicarbonate and combinations thereof;
and wherein the at least a portion of the aqueous liquid comprises at least a portion of the captured carbon dioxide in a form of the dissolved carbonate material.

26. A method according to example implementation combination 25, wherein the preparing the feed of electrolyte solution comprises increasing a ratio of concentration of dissolved alkali metal carbonate to concentration of dissolved alkali metal bicarbonate in the at least a portion of the aqueous.

27. A method according to either one of example implementation combination 25 or example implementation combination 26, wherein the feed of the electrolyte solution comprises a ratio of dissolved alkali metal carbonate to concentration of dissolved alkali metal bicarbonate of at least 1:1.

28. A method according to any one of example implementation combinations 1-27, wherein as fed to the scrubbing, the aqueous liquid comprises dissolved alkali metal carbonate capture agent, some of which is converted to dissolved alkali metal bicarbonate during the scrubbing, and the preparing the feed of the electrolyte solution comprises:
treating at least a portion of the aqueous liquid to precipitate at least a portion of the alkali metal bicarbonate to form an alkali metal bicarbonate precipitate.

29. A method according to example implementation combination 28, wherein the preparing the feed of the electrolyte solution comprises:
after the treating, separating at least a portion of the alkali metal bicarbonate precipitate from the aqueous liquid; and
after the separating at least a portion of the alkali metal bicarbonate precipitate from the aqueous liquid, adding alkali metal carbonate to the at least a portion of the aqueous liquid including at least a portion of the captured sulfur.

30. A method according to either one of example implementation combination 28 or example implementation combination 29, comprising calcining at least a portion of the alkali metal bicarbonate precipitate to form alkali metal carbonate and carbon dioxide gas.

31. A method according to example implementation combination 30, comprising preparing a feed of the aqueous liquid as fed to the scrubbing, wherein the feed of the aqueous liquid includes at least a portion of the alkali metal carbonate produced during the calcining.

32. A method according to either one of example implementation combination 30 or example implementation combination 31, wherein the preparing the feed of the electrolyte solution comprises adding at least a portion of the alkali metal carbonate produced during the calcining to the at least a portion of the aqueous liquid including at least a portion of the captured sulfur.

33. A method according to any one of example implementation combinations 28-32, comprising preparing an alkali metal hydroxide product with at least a portion of the alkali metal hydroxide of the catholyte, wherein the product is not recycled or consumed in processing of the method.

34. A method according to example implementation combination 33, comprising containing the product in a container for shipping.

35. A method according to example implementation combination 34, comprising shipping the container containing the product for delivery to a location distant from a location where the method is performed.

36. A method according to any one of example implementation combinations 33-35, comprising preparing a feed of the aqueous liquid as fed to the scrubbing, wherein the feed of the aqueous liquid comprises a quantity of fresh feed of sodium carbonate that is large enough to at least compensate for alkali metal in the product.

37. A method according to any one of example implementation combinations 1-36, comprising feeding the feed of the electrolyte solution to the anode side of the electrochemical reactor.

38. A method according to any one of example implementation combinations 1-21, comprising during the electrochemical processing generating hydrogen gas from a cathode region of the electrochemical reactor.

39. A method according to example implementation combination 1, wherein:
the feed of the electrolyte solution comprises a ratio of alkali metal sulfide to alkali metal hydrosulfide of at least 1:1;
the feed of the electrolyte solution has a pH in a range of from pH 10 to pH 14:
the recovered anolyte is substantially free of elemental sulfur precipitate prior to the treating; and
the treating comprises contacting at least a portion of the recovered anolyte with an oxidizing agent to oxidize sulfur in the polysulfide to elemental sulfur, wherein the oxidizing agent comprises one or more of an alkali metal hypochlorite, hydrogen peroxide, an alkali metal ferricyanide, sulfur dioxide gas, alkali metal metabisulfite, alkali metal trihalogenide and oxygen gas.

40. A method according to example implementation combination 39, wherein:
as fed to the scrubbing, the aqueous liquid comprises dissolved alkali metal carbonate capture agent, some of which is converted to dissolved alkali metal bicarbonate during the scrubbing, and the preparing the feed of the electrolyte solution comprises:
treating at least a portion of the aqueous liquid to precipitate at least a portion of the alkali metal bicarbonate to form an alkali metal bicarbonate precipitate;
separating at least a portion of the alkali metal bicarbonate precipitate from the aqueous liquid.

41. A method according to example implementation combination 40, wherein the preparing a feed of electrolyte solution comprises:
increasing pH of the at least a portion of the aqueous liquid from a first pH in a range of from pH 9 to pH 11 to a second pH in a range of from pH 12 to pH 14.

42. A method according to example implementation combination 41, comprising:

calcining at least a portion of the alkali metal bicarbonate precipitate to form alkali metal carbonate and carbon dioxide gas; and performing one or both of the following:

adding at least a portion of the alkali metal carbonate produced during the calcining to at least a portion of the aqueous liquid including at least a portion of the captured sulfur during the preparing a feed of electrolyte solution; and preparing a feed of the aqueous liquid as fed to the scrubbing, wherein the feed of the aqueous liquid includes at least a portion of the alkali metal carbonate produced during the calcining.

43. A method to prepare one or more chemical products using hydrogen sulfide, the method comprising:

scrubbing a gas stream to remove hydrogen sulfide from the gas stream into an aqueous liquid that prior to the scrubbing comprises dissolved alkali metal carbonate capture agent, wherein during the scrubbing the alkali metal carbonate capture reagent reacts to capture sulfur of at least a portion of the hydrogen sulfide in the aqueous liquid in the form of alkali metal hydrosulfide and to generate dissolved alkali metal bicarbonate in the aqueous liquid;

preparing a feed of electrolyte solution feed comprising at least a portion of aqueous liquid including at least a portion of the captured sulfur in a form of dissolved material selected from the group consisting of alkali metal sulfide and alkali metal hydrosulfide; and electrochemical processing the feed of electrolyte solution to generate alkali metal hydroxide in catholyte and to generate polysulfide in anolyte, the polysulfide comprising at least a portion of the captured sulfur.

44. A method according example implementation combination 43, wherein the preparing the feed of electrolyte solution comprises precipitating at least a portion of the alkali metal bicarbonate from at least a portion of the aqueous liquid after the scrubbing.

45. A method according to either one of example implementation combination 43 or example implementation combination 44, comprising:

recovering at least a portion of the alkali metal hydroxide as a product that is not recycled or consumed in processing of the method.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible embodiments and implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed implementation may be combined in any combination with one or more of any other features of any other implementation or implementations, to the extent that the features are not necessarily technically compatible, and all such combinations are within the scope of the present invention.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, the a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. The abbreviation "ppm" refers to parts per million and "ppb" refers to parts per billion, which may either be by weight or by volume.

What is claimed is:

1. A method to prepare one or more chemical products using hydrogen sulfide, the method comprising:

scrubbing hydrogen sulfide from a gas stream and preparing an aqueous liquid comprising sulfur from at least a portion of the hydrogen sulfide removed from the gas stream captured in the aqueous liquid in dissolved material selected from the group consisting of alkali metal sulfide, alkali metal hydrosulfide and combinations thereof;

preparing a feed of electrolyte solution comprising at least a portion of the aqueous liquid including at least a portion of the captured sulfur in a form of such dissolved material;

electrochemical processing the feed of electrolyte solution to generate in an electrochemical reactor dissolved alkali metal hydroxide in catholyte and dissolved polysulfide in anolyte, wherein the dissolved polysulfide comprises at least a portion of the captured sulfur;

recovering at least a portion of the anolyte comprising dissolved polysulfide from the electrochemical reactor.

2. A method according to claim 1, comprising treating at least a portion of the recovered anolyte outside of the electrochemical reactor to convert at least a portion of sulfur of the polysulfide into elemental sulfur precipitate; and after the treating, separating the elemental sulfur precipitate from the treated anolyte.

3. A method according to claim 2, wherein the treating comprises contacting at least a portion of the recovered anolyte with an oxidizing agent to oxidize sulfur in the polysulfide to elemental sulfur.

4. A method according to claim 1, comprising preparing a feed of the aqueous liquid as fed to the scrubbing, wherein the feed of the aqueous liquid includes at least a portion of the polysulfide of the recovered anolyte.

5. A method according to claim 1, wherein the preparing a feed of electrolyte solution comprises:
increasing pH of the at least a portion of the aqueous liquid; and
wherein the increasing pH comprises increasing the pH from a first pH in a range of from pH 9 to pH 11 to a second pH in a range of from pH 12 to pH 14.

6. A method according to claim 1, wherein the preparing a feed of electrolyte solution comprises:
increasing a ratio of concentration of dissolved alkali metal sulfide to concentration of dissolved alkali metal hydrosulfide in the at least a portion of the aqueous liquid.

7. A method according to claim 6, wherein the increasing a ratio comprises increasing the ratio from a first ratio of not larger than 1:10 to a second ratio of at least 1:1 or larger.

8. A method according to claim 1, wherein the feed of the electrolyte solution comprises a ratio of alkali metal sulfide to alkali metal hydrosulfide of at least 1:1; and
the feed of the electrolyte solution has a pH in a range of from pH 10 to pH 14.

9. A method according to claim 1, wherein the gas stream comprises carbon dioxide and the method comprises:
scrubbing carbon dioxide from the gas stream into the aqueous liquid to capture carbon dioxide in the aqueous liquid in dissolved carbonate material selected from the group consisting of alkali metal carbonate, alkali metal bicarbonate and combinations thereof;
and wherein the at least a portion of the aqueous liquid comprises at least a portion of the captured carbon dioxide in a form of the dissolved carbonate material;
and wherein the preparing the feed of electrolyte solution comprises increasing a ratio of concentration of dissolved alkali metal carbonate to concentration of dissolved alkali metal bicarbonate in the at least a portion of the aqueous liquid.

10. A method according to claim 9, wherein the feed of the electrolyte solution comprises a ratio of dissolved alkali metal carbonate to concentration of dissolved alkali metal bicarbonate of at least 1:1.

11. A method according to claim 1, wherein as fed to the scrubbing, the aqueous liquid comprises dissolved alkali metal carbonate capture agent, some of which is converted to dissolved alkali metal bicarbonate during the scrubbing, and the preparing the feed of the electrolyte solution comprises:
treating at least a portion of the aqueous liquid to precipitate at least a portion of the alkali metal bicarbonate to form an alkali metal bicarbonate precipitate.

12. A method according to claim 11, wherein the preparing the feed of the electrolyte solution comprises:
after the treating, separating at least a portion of the alkali metal bicarbonate precipitate from the aqueous liquid; and
after the separating at least a portion of the alkali metal bicarbonate precipitate from the aqueous liquid, adding alkali metal carbonate to the at least a portion of the aqueous liquid including at least a portion of the captured sulfur.

13. A method according to claim 11, comprising calcining at least a portion of the alkali metal bicarbonate precipitate to form alkali metal carbonate and carbon dioxide gas.

14. A method according to claim 13, comprising preparing a feed of the aqueous liquid as fed to the scrubbing, wherein the feed of the aqueous liquid includes at least a portion of the alkali metal carbonate produced during the calcining.

15. A method according to claim 13, wherein the preparing the feed of the electrolyte solution comprises adding at least a portion of the alkali metal carbonate produced during the calcining to the at least a portion of the aqueous liquid including at least a portion of the captured sulfur.

16. A method according to claim 1, wherein:
the feed of the electrolyte solution comprises a ratio of alkali metal sulfide to alkali metal hydrosulfide of at least 1:1;
the feed of the electrolyte solution has a pH in a range of from pH 10 to pH 14:
the recovered anolyte is substantially free of elemental sulfur precipitate prior to the treating; and
the treating comprises contacting at least a portion of the recovered anolyte with an oxidizing agent to oxidize sulfur in the polysulfide to elemental sulfur, wherein the oxidizing agent comprises one or more of an alkali metal hypochlorite, hydrogen peroxide, an alkali metal ferricyanide, sulfur dioxide gas, alkali metal metabisulfite, alkali metal trihalogenide and oxygen gas.

17. A method according to claim 16, wherein:
as fed to the scrubbing, the aqueous liquid comprises dissolved alkali metal carbonate capture agent, some of which is converted to dissolved alkali metal bicarbonate during the scrubbing, and the preparing the feed of the electrolyte solution comprises:
treating at least a portion of the aqueous liquid to precipitate at least a portion of the alkali metal bicarbonate to form an alkali metal bicarbonate precipitate; and
separating at least a portion of the alkali metal bicarbonate precipitate from the aqueous liquid; and
the preparing a feed of electrolyte solution comprises increasing pH of the at least a portion of the aqueous liquid from a first pH in a range of from pH 9 to pH 11 to a second pH in a range of from pH 12 to pH 14;
and the method further comprises:
calcining at least a portion of the alkali metal bicarbonate precipitate to form alkali metal carbonate and carbon dioxide gas; and
performing one or both of the following:
adding at least a portion of the alkali metal carbonate produced during the calcining to at least a portion of the aqueous liquid including at least a portion of the captured sulfur during the preparing a feed of electrolyte solution; and
preparing a feed of the aqueous liquid as fed to the scrubbing, wherein the feed of the aqueous liquid includes at least a portion of the alkali metal carbonate produced during the calcining.

18. A method to prepare one or more chemical products using hydrogen sulfide, the method comprising:
scrubbing a gas stream to remove hydrogen sulfide from the gas stream into an aqueous liquid that prior to the scrubbing comprises dissolved alkali metal carbonate capture agent, wherein during the scrubbing the alkali metal carbonate capture reagent reacts to capture sulfur of at least a portion of the hydrogen sulfide in the aqueous liquid in the form of alkali metal hydrosulfide and to generate dissolved alkali metal bicarbonate in the aqueous liquid;

preparing a feed of electrolyte solution feed comprising at least a portion of aqueous liquid including at least a portion of the captured sulfur in a form of dissolved material selected from the group consisting of alkali metal sulfide and alkali metal hydrosulfide; and electrochemical processing the feed of electrolyte solution to generate alkali metal hydroxide in catholyte and to generate polysulfide in anolyte, the polysulfide comprising at least a portion of the captured sulfur.

19. A method according claim 18, wherein the preparing the feed of electrolyte solution comprises precipitating at least a portion of the alkali metal bicarbonate from at least a portion of the aqueous liquid after the scrubbing.

20. A method according to claim 18, comprising:
recovering at least a portion of the alkali metal hydroxide as a product that is not recycled or consumed in processing of the method.

\* \* \* \* \*